US011231367B2

(12) United States Patent
Ogawa

(10) Patent No.: US 11,231,367 B2
(45) Date of Patent: Jan. 25, 2022

(54) INFORMATION PROCESSING APPARATUS, INFORMATION PROCESSING METHOD, PROGRAM, AND SENSING APPARATUS

(71) Applicant: Sony Group Corporation, Tokyo (JP)

(72) Inventor: Tetsu Ogawa, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/331,719

(22) PCT Filed: Sep. 12, 2017

(86) PCT No.: PCT/JP2017/032747
§ 371 (c)(1),
(2) Date: Mar. 8, 2019

(87) PCT Pub. No.: WO2018/056102
PCT Pub. Date: Mar. 29, 2018

(65) Prior Publication Data
US 2019/0204228 A1 Jul. 4, 2019

(30) Foreign Application Priority Data
Sep. 26, 2016 (JP) .............................. JP2016-186478

(51) Int. Cl.
*G01N 21/64* (2006.01)
*A01G 7/00* (2006.01)
(Continued)

(52) U.S. Cl.
CPC ........... *G01N 21/6428* (2013.01); *A01G 7/00* (2013.01); *G01N 21/648* (2013.01);
(Continued)

(58) Field of Classification Search
CPC .............. A01G 7/00; G01N 2021/635; G01N 2021/8466; G01N 21/6408; G01N 21/6428; G01N 21/648; G01N 21/6486
See application file for complete search history.

(56) References Cited

U.S. PATENT DOCUMENTS

2005/0283091 A1* 12/2005 Kink .................... A61B 5/0537
600/547
2006/0102851 A1* 5/2006 Jalink ................ G01N 21/6456
250/461.2
(Continued)

FOREIGN PATENT DOCUMENTS

CN 101953299 A 1/2011
CN 103234947 A 8/2013
(Continued)

OTHER PUBLICATIONS

Extended European Search Report dated Sep. 5, 2019 for corresponding European Application No. 17852879.0.
(Continued)

*Primary Examiner* — Marcus H Taningco
(74) *Attorney, Agent, or Firm* — Michael Best & Friedrich LLP

(57) ABSTRACT

The present technique relates to an information processing apparatus, an information processing method, a program, and a sensing apparatus that each enable determination as to the state of the inside of a living body. The information processing apparatus applies a calculation algorism in accordance with a transient model that presents functions that a living body to be measured has, to measurement data of a transient response obtained from the living body, calculates an unknown parameter of parameters relating to the transient model, and thereby enables determination as to the state of the inside of the living body. The present technique is
(Continued)

applicable to, for example, an information processing apparatus that calculates the quantum yield of photosynthesis of a plant.

15 Claims, 24 Drawing Sheets

(51) Int. Cl.
G01N 21/63 (2006.01)
G01N 21/84 (2006.01)

(52) U.S. Cl.
CPC ..... *G01N 21/6408* (2013.01); *G01N 21/6486* (2013.01); *G01N 2021/635* (2013.01); *G01N 2021/8466* (2013.01)

(56) References Cited

U.S. PATENT DOCUMENTS

| 2010/0068750 | A1* | 3/2010 | Pogosjan | G01N 21/6486 435/29 |
| 2012/0310540 | A1* | 12/2012 | McDermitt | G01N 33/0098 702/19 |
| 2014/0210448 | A1* | 7/2014 | Brunda | G01R 29/0857 324/72 |
| 2018/0313760 | A1* | 11/2018 | Kramer | A01G 7/00 |

FOREIGN PATENT DOCUMENTS

| CN | 104819968 A | 8/2015 |
| CN | 105588921 A | 5/2016 |
| JP | 11-332375 A | 12/1999 |
| JP | 2001352849 A | 12/2001 |
| JP | 20065504956 A | 2/2006 |
| JP | 2010246488 A | 11/2010 |
| WO | 2004026022 A1 | 4/2004 |

OTHER PUBLICATIONS

R. J. Strasser et al., "Chapter 12: Analysis of the Chlorophyll a Fluorescence Transient" in Advances in Photosynthesis and Respiration: Chlorophyll a Fluorescence—A Signature of Photosynthesis, 2004, Springer Netherlands, Dordrecht, XP055458121, ISBN: 978-1-4020-3217-2, vol. 19, pp. 321-362.

R. J. Strasser et al., Chapter 25: The Fluorescence Transient as a Tool to Characterize and Scree Photosynthetic Samples' in Probing Photosynthesis: Mechanisms, Regulation and Adaptation, Dec. 2000, Taylor & Francis, London, XP055616333, pp. 445-483.

Chinese Office Acton dated Feb. 1, 2021 for corresponding Chinese Application No. 201780057538.8.

\* cited by examiner

FIG. 18

| MEASUREMENT SCHEME | TARGET OF MEASUREMENT | LIGHT BEAM USED IN MEASUREMENT (BY INTENSITY) | |
|---|---|---|---|
| SCHEME OF CURRENT STATE | Fv/Fm | MEASUREMENT LIGHT BEAM APPROXIMATELY 10 μmol/m²/s | UNNECESSARY |
| | ΦPS II | UNNECESSARY | SATURATED LIGHT BEAM 2,000 μmol/m²/s OR HIGHER |
| SCHEME OF PRESENT TECHNIQUE | Fv/Fm | MEASUREMENT LIGHT BEAM APPROXIMATELY 10 μmol/m²/s | STEADY LIGHT BEAM INTENSITY USED FOR GROWING (APPROXIMATELY 100 μmol/m²/s AS MINIMAL VALUE) |
| | | | FIRST GROWING LIGHT BEAM INTENSITY USED FOR GROWING (APPROXIMATELY 100 μmol/m²/s AS MINIMAL VALUE) |
| | ΦPS II | UNNECESSARY | FIRST GROWING LIGHT BEAM, SECOND GROWING LIGHT BEAM INTENSITY USED FOR GROWING (APPROXIMATELY 100 μmol/m²/s AS MINIMAL VALUE) HOWEVER, FIRST GROWING LIGHT BEAM<SECOND GROWING LIGHT BEAM |

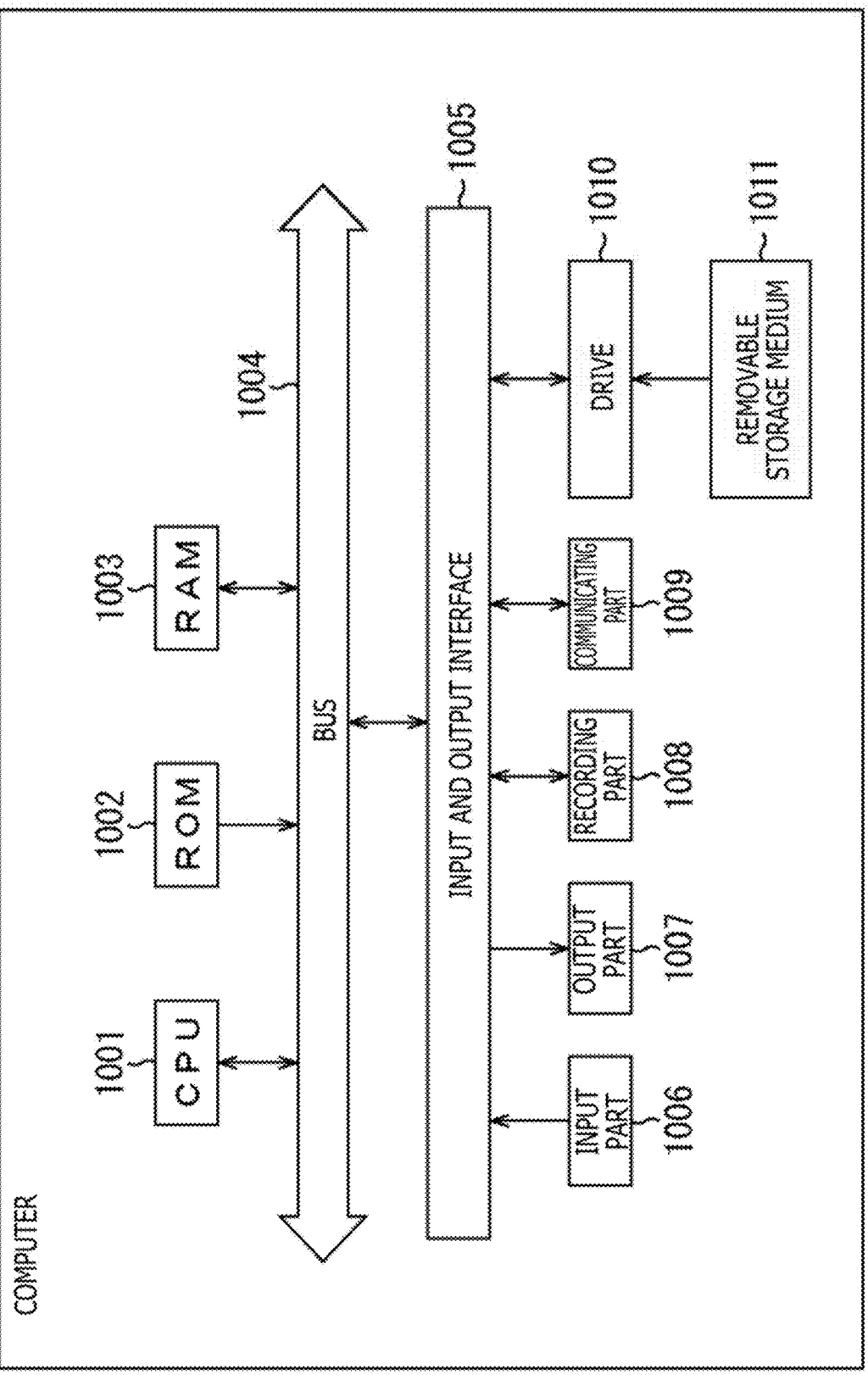

INFORMATION PROCESSING APPARATUS, INFORMATION PROCESSING METHOD, PROGRAM, AND SENSING APPARATUS

TECHNICAL FIELD

The present technique relates to an information processing apparatus, an information processing method, a program, and a sensing apparatus and, particularly, to an information processing apparatus, an information processing method, a program, and a sensing apparatus each adapted to be able to determine the state of the inside of a living body.

BACKGROUND ART

Growth of a plant is influenced by the state of the environment such as sunshine and the temperature, but presents different behaviors depending on the species of the plant and the state of its acclimation to the environment even in the same environment. To excellently grow a plant, it is therefore necessary to not only understand the state of the environment but also diagnose the growth of the plant and arrange the environment for growth in accordance with the state of the plant.

For example, a technique disclosed in PTL 1 is known as a diagnosis method of this type for the growth of a plant.

CITATION LIST

Patent Literature

[PTL 1]
Japanese Patent Laid-Open No. Hei 11-332375

SUMMARY

Technical Problem

Relating to the above, it is generally difficult to quickly and accurately determine the state of the inside of a living body such as the growth of a plant, and it is therefore desired to enable such a determination.

The present technique was conceived in view of the above circumstances and enables determination as to the state of the inside of a living body.

Solution to Problem

An information processing apparatus in an aspect of the present technique is an information processing apparatus including a calculating part that applies a calculation algorism in accordance with a transient model that presents functions that a living body to be measured has, to measurement data of a transient response obtained from the living body, the calculating part thereby calculating an unknown parameter of parameters relating to the transient model.

An information processing method or a program in an aspect of the present technique is an information processing method or a program that corresponds to the information processing apparatus in the above aspect of the present technique.

With the information processing apparatus, the information processing method, and the program, a calculation algorism in accordance with a transient model presenting functions that a living body to be measured has is applied to measurement data of a transient response obtained from the living body and an unknown parameter of parameters relating to the transient model is thereby calculated.

A sensing apparatus in an aspect of the present technique is a sensing apparatus including a sensor that senses a living body to be measured, and a calculating part that applies a calculation algorism in accordance with a transient model presenting functions that a living body to be measured has, to measurement data of a transient response obtained from the living body by the sensing by the sensor, the calculating part thereby calculating an unknown parameter of parameters relating to the transient model.

With the sensing apparatus of the aspect of the present technique, sensing is executed for the living body to be measured, and the calculation algorism in accordance with the transient model presenting the functions that the living body has is applied to the measurement data of a transient response obtained from the living body by the sensing and an unknown parameter of the parameters relating to the transient model is calculated.

In addition, the information processing apparatus and the sensing apparatus may each be an independent apparatus or may be internal blocks that constitute one apparatus.

Advantageous Effect of the Invention

According to an aspect of the present technique, the state of the inside of a living body can be determined.

In addition, the effect described herein is not necessarily limited and may be any one of the effects described in this disclosure.

BRIEF DESCRIPTION OF DRAWINGS

FIG. 18 is a table explaining differences in the light beam used for measurement between the scheme in the current state and the scheme of the present technique.

FIG. 24 is a diagram depicting an example of the configuration of a computer.

DESCRIPTION OF EMBODIMENTS

Embodiments of the present technique will be described below with reference to the drawings. In addition, the description will be made in the following order.

1. Summary of Present Technique
2. First Embodiment: Basic Configuration
3. Second Embodiment: Configuration Using Laser Light Beam
4. Third Embodiment: Configuration Using External Light Emitting Apparatus
5. Fourth Embodiment: Configuration Using Intensity Variation of Environmental Light
6. Fifth Embodiment: Configuration Using External Measurement Data
7. Modification Examples
8. Configuration of Computer 1. Summary of Present Technique The photosynthesis activity of a plant and the growth of the plant body associated therewith are influenced by the state of the environment such as the sunshine, the temperature, the vapor pressure deficit, the concentration of carbon dioxide ($CO_2$ concentration), the soil moisture, and the fertilizer components in the soil and, even in the same environment, each present different behaviors depending on the species of the plant and the state of the acclimation to the environment. For excellent growth of a plant, it is therefore necessary to not only understand the state of the environment but also monitor (survey) the state of the inside of the plant with its variation over time and control the environment for the growth in accordance with this state.

It is however generally extremely difficult to quickly and accurately monitor the state of the inside of a plant. For example, the fact that a plant is in the state where the plant cannot sufficiently perform photosynthesis even with sufficient sunshine because the temperature is excessively low is determined from the past experiences or this determination is difficult as far as the result cannot be observed that this state remains as it is after several days elapses to discover insufficient growth of the plant. Moreover, in the open-air environment or the like whose environmental conditions are inconstant, it is difficult to identify and quantify the environmental conditions that influence the growth of the plant or to take any countermeasure coping with the state.

In view of these current circumstances, the present technique enables determination (diagnosis) of the state of the inside of a plant while, in this section, the mechanism of the photosynthesis, the techniques in the current state, and the like to be the premises for describing the present technique will first be described and the specific content of the present technique will thereafter be described.

(Mechanism of Photosynthesis)

Figure 1:
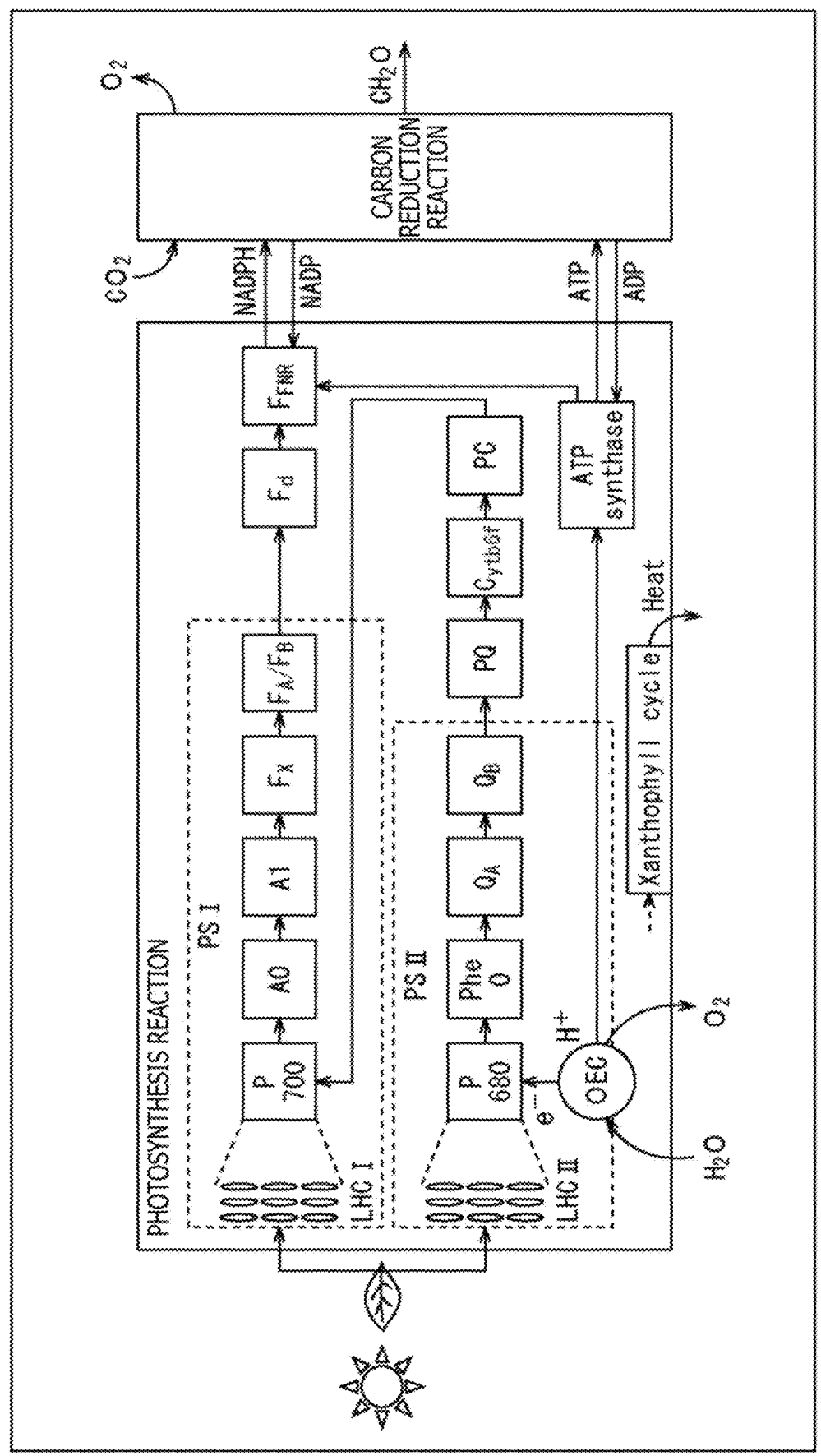
FIG. 1 is a diagram depicting the mechanism of photosynthesis of a plant.

FIG. 1 is a diagram to explain the mechanism of the photosynthesis of a plant.

As depicted in FIG. 1, roughly dividing the photosynthesis, the photosynthesis includes a photochemical reaction (Photochemical System) and a carbon reduction reaction (Calvin-Benson Cycle). The photochemical reaction is a reaction process of obtaining energy by decomposing water ($H_2O$) using energy of light. The carbon reduction reaction is a reaction process of decomposing carbon dioxide ($CO_2$) and generating sugar ($CH_2O$) using the energy obtained from the photochemical reaction in the pre-stage.

More specifically, the photochemical reaction is divided into a photochemical system I (PSI) and a photochemical system II (PSII) on the basis of the difference in the wavelength band of the received light. As depicted in FIG. 1, the photochemical reaction mainly includes light-harvesting antennas (LHCI and LHCII) that each collect the light, reaction centers (RCI and RCII: that are denoted by "P680" and "P700" in FIG. 1) that each excite electrons using the energy of the light, and intermediate pools ($Q_A$, $Q_D$, PQ, A0, and the like) that each transfer and temporarily store therein electrons along the electron transfer system.

In addition, nicotinamide adenine dinucleotide phosphate (NADPH) is synthesized by an oxidation-reduction reaction of a Z-scheme that presents the energy gradient of the electrons in this electron transfer system. Nicotinamide adenine dinucleotide phosphate is present anywhere in a living body, has two states of an oxidized form ($NADP^+$) and a reduced form (NADPH), and plays the role of transporting electrons and hydrogen. However, the oxidized form ($NADP^+$) tends to receive electrons and the reduced form (NADPH) tends to release electrons.

Moreover, in the photochemical reaction, water ($H_2O$) is decomposed by an oxygen evolving complex (OEC) and oxygen ($CO_2$) is generated. Using the energy of proton ($H^+$) obtained in this decomposition, an ATP synthesizing enzyme (ATP synthase) synthesizes adenosine triphosphate (ATP) from adenosine diphosphate (ADP).

In addition, to dissipate the surplus energy unable to be treated, as heat, the photochemical reaction has a xanthophyll cycle present therein that can release a proper amount of energy as heat changing the chemical composition thereof in accordance with the magnitude of the surplus energy.

On the other hand, in the carbon reduction reaction, carbon dioxide ($CO_2$) is decomposed using nicotinamide adenine dinucleotide phosphate (NADPH) and adenosine triphosphate (ATP) produced in the photochemical reaction, to produce sugar ($CH_2O$).

(Chlorophyll Fluorescence)

Figure 2:
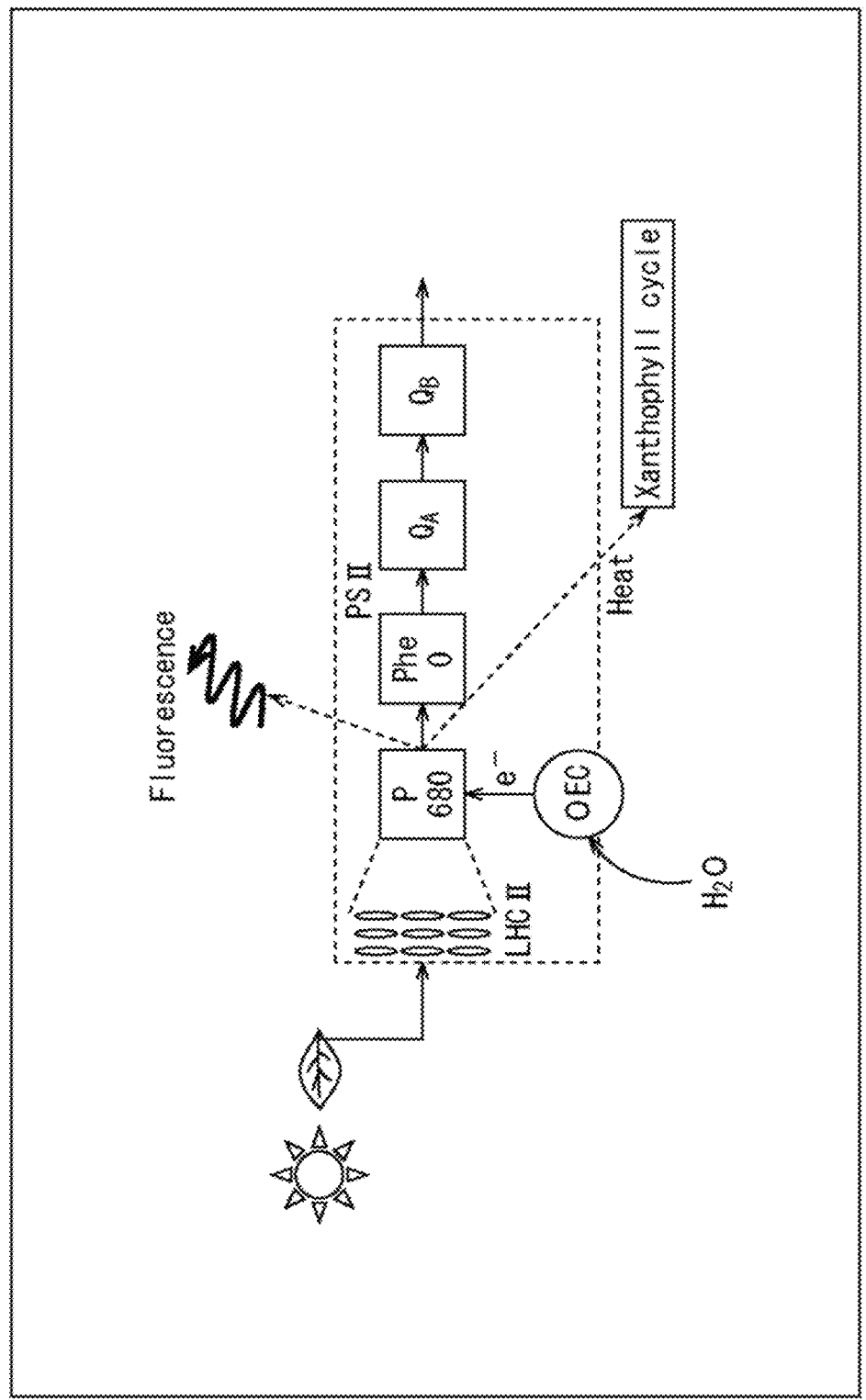
FIG. 2 is a diagram to explain chlorophyll fluorescence of a plant.

Chlorophyll fluorescence is fluorescence emitted from a plant associated with the photosynthesis of the plant and is a phenomenon that, when the energy is not extracted within a specific time period from the reaction center (RC) that has the electrons excited therein by the light, the energy is released as the fluorescence having a wavelength of, in the case of a higher plant, approximately 680 to 750 nm. In addition, the radiated energy is generally 0.5 to 3% relative to the energy of the incident light, and this percentage varies in accordance with the state of the photosynthesis of the plant. FIG. 2 schematically depicts the chlorophyll fluorescence of a plant.

Concerning the above, the case where the intermediate pool of the electron transfer system is in the state where the intermediate pool is oxidized and can accept electrons is referred to as "the reaction center (RC) is open" and the electrons excited by the light outflows through the electron transfer system and the excitation state is dissolved. This is referred to as "photochemical quenching (PhotoChemicalQuenching)." In general, in the case where the photosynthesis is efficiently advanced, the intensity of the chlorophyll fluorescence is small because the degree of the photochemical quenching is large.

On the other hand, the case where the intermediate pool of the electron transfer system is in the state where the intermediate pool is reduced and cannot accept any electron is referred to as "the reaction center (RC) is closed." When all the reaction centers (RCs) are closed, the photochemical quenching discontinues (the electron transfer to the electron transfer system is discontinued) and the intensity of the chlorophyll fluorescence becomes maximal.

A phenomenon that the electrons excited by the light are dissipated as the chlorophyll fluorescence or heat is referred to as "non-photochemical quenching (Non-PhotoChemicalQuenching)." In the case where a strong light beam unable to be treated by a plant is applied to the plant, the intensity of the chlorophyll fluorescence is temporarily increased while the intensity of the chlorophyll fluorescence is reduced when the activation of the carbon reduction reaction and the chemical composition of the xanthophyll cycle are varied as the time elapses and the heat can efficiently be released.

(Reaction Rate of Electron Transfer System)

Figure 3:
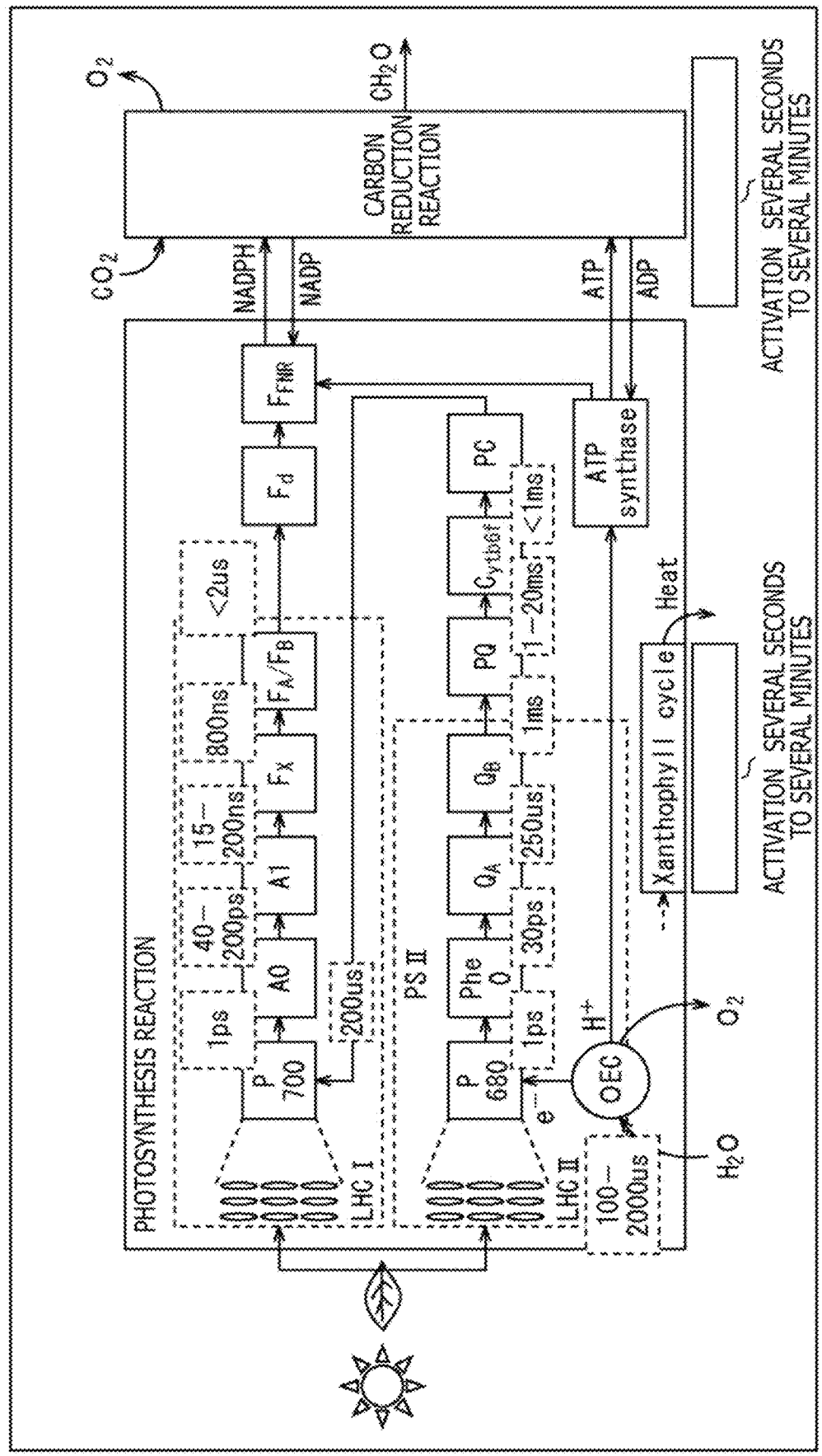
FIG. 3 is a diagram to explain a short response and a long response.

In the photochemical reaction, the reaction rate of the electron transfer system relative to the input of the light presents a high reaction rate such as picoseconds to several tens of milliseconds, and this is referred to as "short response." FIG. 3 depicts description for the fact that the reaction rate of the electron transfer system in the photochemical reaction becomes picoseconds to several tens of milliseconds.

On the other hand, the carbon reduction reaction and the xanthophyll cycle each take several seconds or longer to be activated and each transition into the stationary state thereof taking several minutes in accordance with the intensity of the light. This phenomenon is referred to as "long response." FIG. 3 depicts description for the fact that the activation of each of the carbon reduction reaction and the xanthophyll cycle takes several seconds to several minutes. The values of the timing parameters depicted in FIG. 3 are each an example.

(Quantum Yield of Photosynthesis)

Types of the quantum yield of the photosynthesis include, for example, "Fv/Fm" and "φPSII," and the values of these enable learning in real time at what degree of efficiency a plant performs the photosynthesis under the current environmental conditions.

Fv/Fm is the maximal quantum yield of the electron transfer system of the photochemical system II (PSII) of the photosynthesis, and represents the quantum yield (the number of the output electrons relative to the number of the input photons) of the photochemical system II in the dark-adapted state, that is not limited by the carbon reduction reaction and the xanthophyll cycle.

φPSII is the quantum yield of the electron transfer system of the photochemical system II (PSII) of the photosynthesis, and represents the quantum yield obtained when light having a specific intensity is applied and the photosynthesis is performed.

Figure 4:
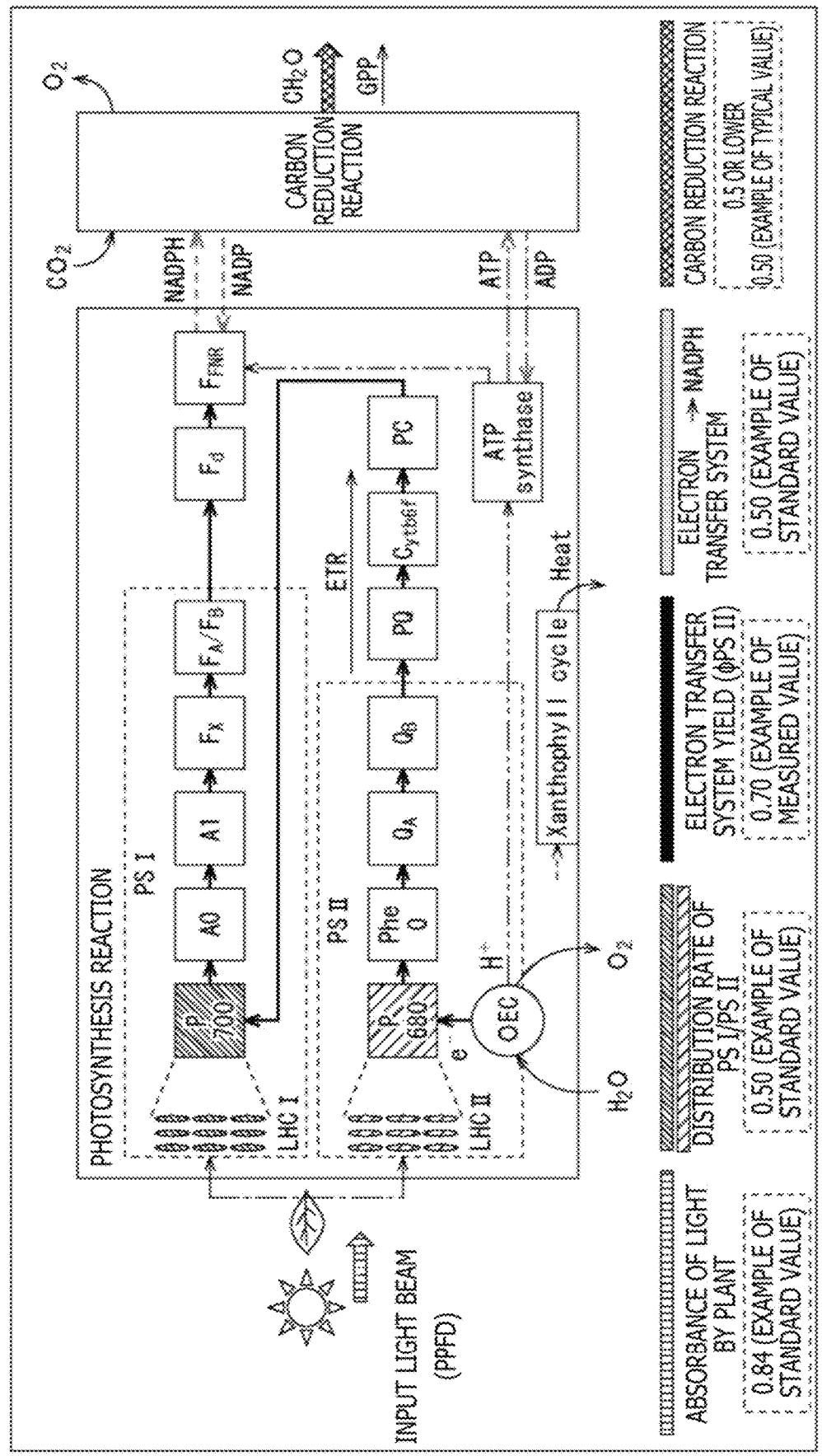
FIG. 4 is a diagram to explain a quantum yield of the photosynthesis.

For example, as depicted in FIG. 4, the electron transport rate (ETR) can be calculated by using the intensity I of the input light (PPFD [$\mu mol/m^2/s$]), the absorbance of light by a plant (a community thereof) (0.84 is generally often used), the distribution ratio of the input light for the photochemical system I (PSI) and the photochemical system II (PSII) (a constant of 0.5 is generally often used), and the quantum yield of the electron transfer system of the photochemical system II of the photosynthesis (φPSII) (it is assumed that 0.7 is gauged).

For example, the electron transport rate (ETR) in the case where the PPFD value is 1,000 [$\mu mol/m^2/s$] is ETR=1,000×0.84×0.5×0.7=294 [$\mu mol/m^2/s$]. In sum, the electron transport rate is ETR=I×0.84×0.5×φPSII [$\mu mol/m^2/s$]. The electron transport rate (ETR) is a parameter that quantitatively represents in real time at what rate the plant converts the light into electrons under the current environmental conditions and in the current state of the plant.

Concerning the above, the PPFD value is the value of the photosynthesis photon flux density (PPFD) and is represented by the number of photons having a wavelength from 400 to 700 nm that is the absorption wavelength of the chlorophyll, that enter the chlorophyll per unit time and per unit area.

Furthermore, in the case where it is assumed that the efficiency of nicotinamide adenine dinucleotide phosphate (NADPH) from the electron transfer system is 0.5 and the efficiency of the carbon reduction reaction is 0.5, the gross primary production (GPP) is GPP=ETR×0.5×0.5=73.5 [$\mu mol/m^2/s$].

In addition, the efficiency of the carbon reduction reaction is fluctuated depending on the temperature and the $CO_2$ concentration while, in the case where the efficiency of the carbon reduction reaction is reduced and the upper limit of the acceptable energy is limited, this leads to reduction of the electron transport rate (ETR) and it is therefore known that the correlation between the ETR and the GPP is strong.

(Pulse-Modulated Fluorescence Measurement)

Relating to the above, an approach called "pulse-modulated fluorescence measurement" is present as an approach to gauge in real time the state of the photosynthesis in accordance with the environment and the state of the plant. A photosynthesis gauging device using this approach of the pulse-modulated fluorescence measurement is already practically used. The pulse-modulated fluorescence measurement is the measurement according to which the state of the photosynthesis of a plant is measured by applying to the plant an artificial light beam that is significantly strong whose intensity substantially exceeds that of the sunlight (hereinafter, referred to as "saturated light beam").

Figure 5:
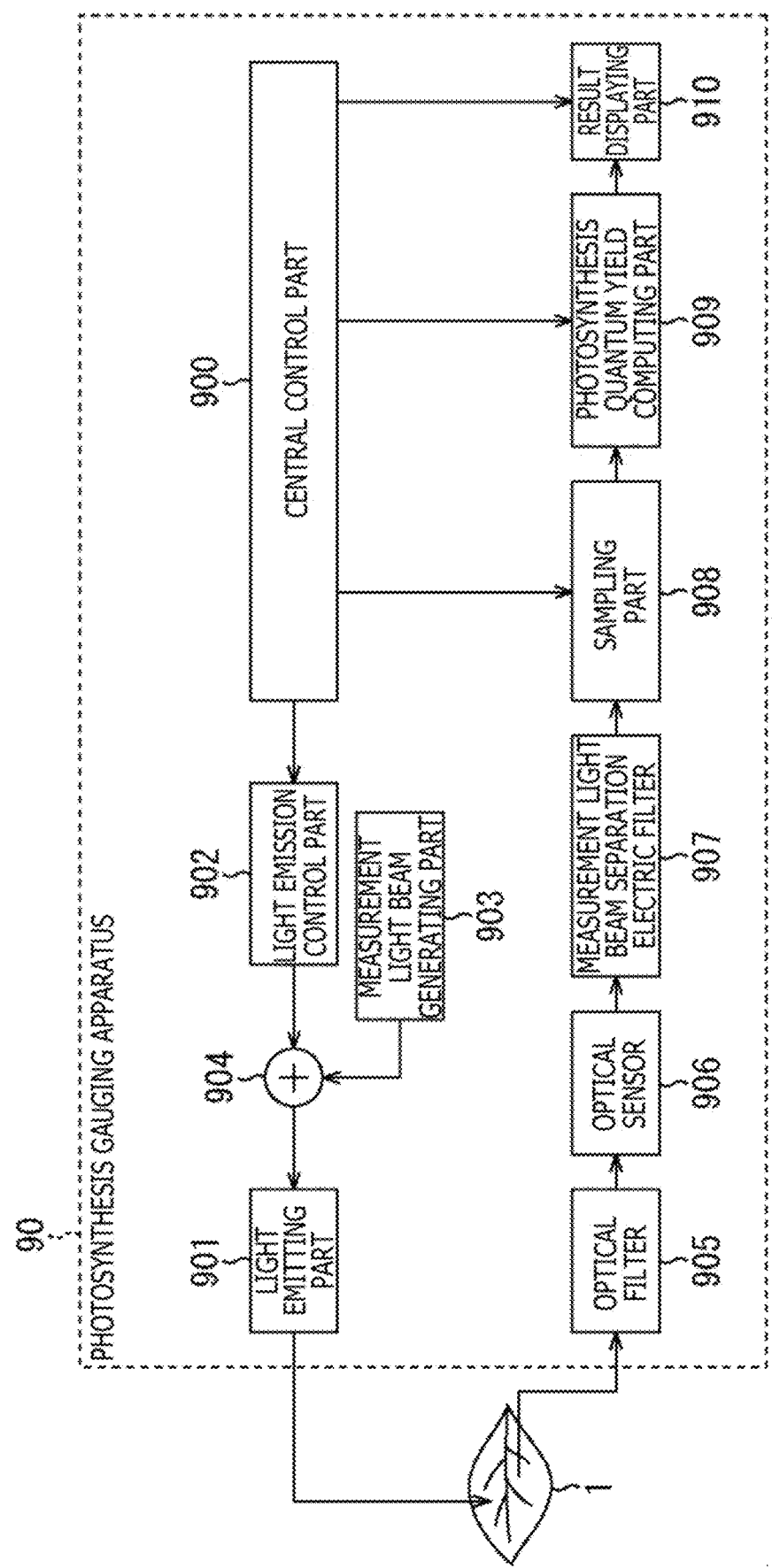
FIG. 5 is a diagram depicting the configuration of a photosynthesis gauging apparatus that uses pulse-modulated fluorescence measurement.

FIG. 5 is a diagram depicting the configuration of a photosynthesis gauging apparatus 90 that uses the pulse-modulated fluorescence measurement.

The photosynthesis gauging apparatus 90 gauges the quantum yield of the photosynthesis of a plant using the saturated light beam. The photosynthesis gauging apparatus 90 includes a central control part 900, a light emitting part 901, a light emission control part 902, a measurement light beam generating part 903, a synthesizing part 904, an optical filter 905, an optical sensor 906, a measurement light beam separation electric filter 907, a sampling part 908, a photosynthesis quantum yield computing part 909, and a result displaying part 910.

In accordance with the control from the central control part 900, the light emission control part 902 synthesizes a pulse-modulated measurement light beam generated by the measurement light beam generating part 903, using the synthesizing part 904 and thereby causes a light beam having a predetermined intensity to be emitted from the light emitting part 901.

Light beams having three types of intensity are emitted from the light emitting part 901 by an LED (Light Emitting Diode). The light beams having the three types of intensity include a first light beam including the measurement light beam (hereinafter, referred to as "measurement light beam"), a second light beam including a steady light beam and the measurement light beam (hereinafter, referred to as "steady light beam+measurement light beam"), and a third light beam including a saturated light beam and the measurement light beam (hereinafter, referred to as "saturated light beam+measurement light beam").

Concerning the above, the measurement light beam is a significantly weak light beam to measure the chlorophyll fluorescence (such as $F_0$) emitted when the reaction center (RC) is in the open state. The saturated light beam is a significantly strong light beam to measure the chlorophyll fluorescence (such as $F_m$ and $F_m'$) emitted when the reaction center (RC) is completely closed. The saturated light beam is established as a light beam having a duration of approximately 0.5 seconds to approximately one second.

The steady light beam is a light beam to measure the chlorophyll fluorescence ($F_s$) emitted in the state where a plant 1 is caused to steadily perform the photosynthesis. This steady light beam is a light beam to continuously be emitted for several minutes until the photosynthesis of the plant 1 is stabilized because the long response is observed.

The optical filter 905 removes the light beams from the light emitting part 901 and any external disturbing light beam, and to thereby extract only the chlorophyll fluorescence from the plant 1. The optical sensor 906 converts the intensity of the chlorophyll fluorescence transmitted through the optical filter 905 into an electric signal.

The measurement light beam separation electric filter 907 is a filter that removes the DC component of the electric signal obtained by the conversion by the optical sensor 906 and that extracts the intensity of the chlorophyll fluorescence relative to the measurement light beam. In accordance with the control from the central control part 900, the sampling part 908 converts the electric signal obtained in the filtering process executed by the measurement light beam separation electric filter 907 from an analog signal into a digital signal.

In accordance with the control from the central control part 900, the photosynthesis quantum yield computing part 909 calculates the quantum yield of the photosynthesis, from the digital signal sampled by the sampling part 908. In accordance with the control from the central control part 900, the result displaying part 910 displays the computation result of the quantum yield of the photosynthesis calculated by the photosynthesis quantum yield computing part 909. Concerning the above, Fv/Fm and $\phi$PSII are displayed each as the quantum yield of the photosynthesis.

The photosynthesis gauging apparatus 90 is configured as above.

(Relation between Light Emission Intensity and Chlorophyll Fluorescence Intensity)

Figure 6:
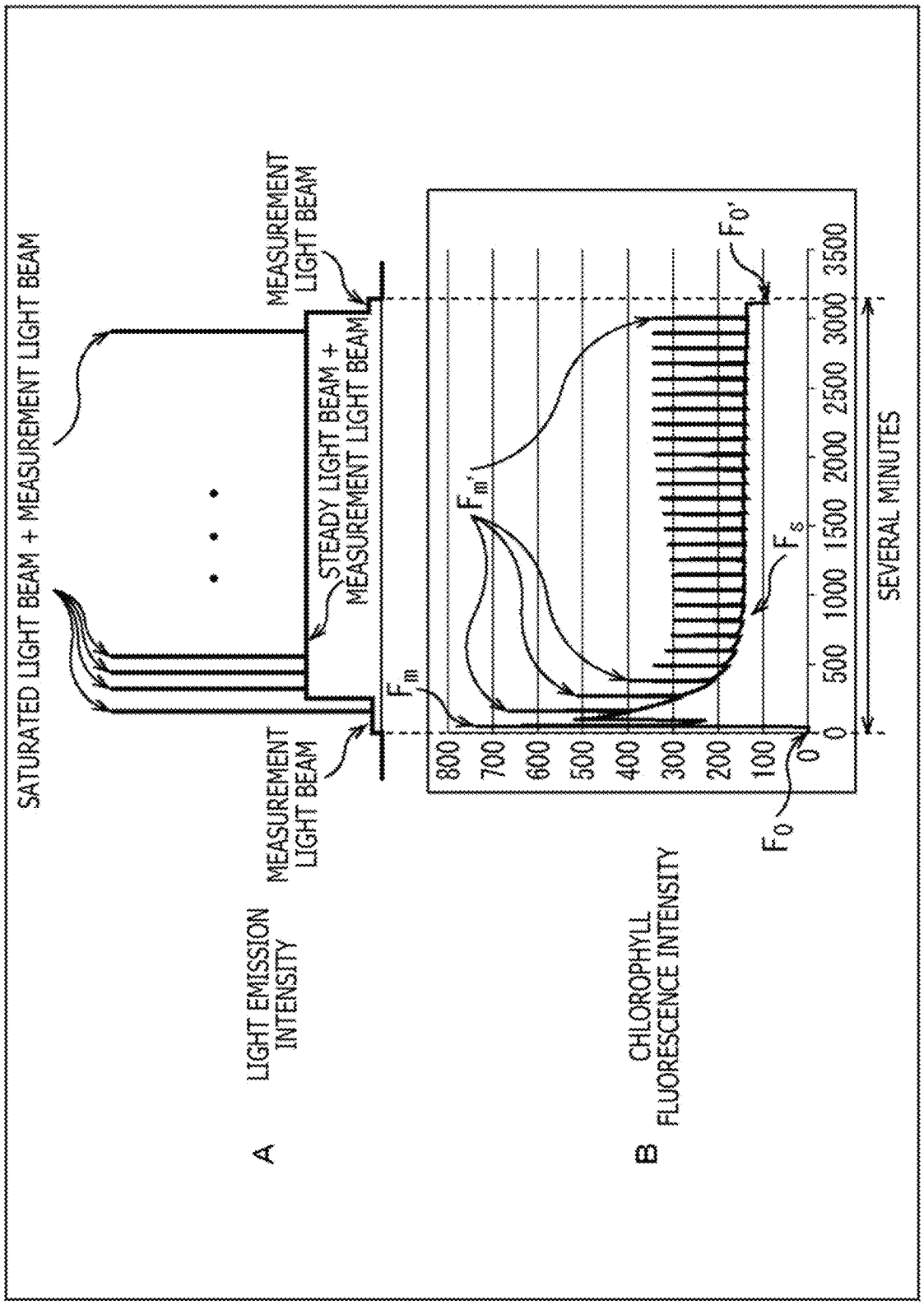
FIG. 6 is a diagram depicting the relation between the light emission intensity of each of light beams applied to a plant and the intensity of the chlorophyll fluorescence.

Concerning the above, in the photosynthesis gauging apparatus 90 in FIG. 5, the sampling of the chlorophyll fluorescence of the plant 1 is executed changing the type of the light beam to be applied to the plant 1 while the relation as depicted in FIG. 6 is obtained by plotting the relation between the light emission intensity of the light beam applied to the plant 1 and the intensity of the chlorophyll fluorescence.

In FIG. 6, A of FIG. 6 depicts the intensity of the light beam emitted from the light emitting part 901 and B of FIG. 6 depicts the intensity of the chlorophyll fluorescence of the plant 1 caused by controlling the light beam emitted from the light emitting part 901. Moreover, in FIG. 6, the lateral direction represents the time and the direction of the time is set to be the direction from the left side toward the right side in FIG. 6.

In A of FIG. 6, a section for only the measurement light beam to be emitted, a section for the saturated light beam and the measurement light beam (the saturated light beam+the measurement light beam) to be emitted, and a section for the steady light beam and the measurement light beam (the steady light beam+the measurement light beam) to be emitted are present in accordance with the level (intensity) of the light beams emitted from the light emitting part 901.

Concerning the above, in the case where Fv/Fm is gauged as the quantum yield of the photosynthesis, the chlorophyll fluorescence ($F_0$) by the measurement light beam is obtained in the section that is immediately after the start of this gauging and in which only the measurement light beam is emitted, and the chlorophyll fluorescence ($F_m$) by the saturated light beam is obtained in the section in which the saturated light beam+the measurement light beam are emitted.

Fv/Fm is thereafter determined as the quantum yield of the photosynthesis by computing Equation (1) below using the chlorophyll fluorescence ($F_0$ and $F_m$) obtained with the above light emission sequence.

$$Fv/Fm=(F_m-F_0)/F_m \quad (1)$$

Moreover, in the case where $\phi$PSII is gauged as the quantum yield of the photosynthesis, the chlorophyll fluorescence ($F_s$) by the steady light beam is obtained in the section in which the steady light beam+the measurement light beam during the time period in which the photosynthesis of the plant 1 is in the steady state are emitted, and the chlorophyll fluorescence ($F_m'$) by the saturated light beam is obtained in the section in which the saturated light beam+the measurement light beam during the time period in which the photosynthesis is in the steady state are emitted.

$\phi$PSII is determined as the quantum yield of the photosynthesis by computing Equation (2) below using the chlorophyll fluorescence ($F_s$ and $F_m'$) obtained with the above light emission sequence.

$$\phi PSII=(F_m'-F_s)/F_s \quad (2)$$

In this manner, the photosynthesis gauging apparatus 90 in FIG. 5 applies the saturated light beam that is the significantly strong light beam to clog the electron transfer system in a short time period (such as, for example, 2 to 3 sec). In addition, at the end of the gauging, the application of the steady light beam is discontinued and the chlorophyll fluorescence ($F_0'$) by the measurement light beam is obtained.

(Electrical Model)

Figure 7:
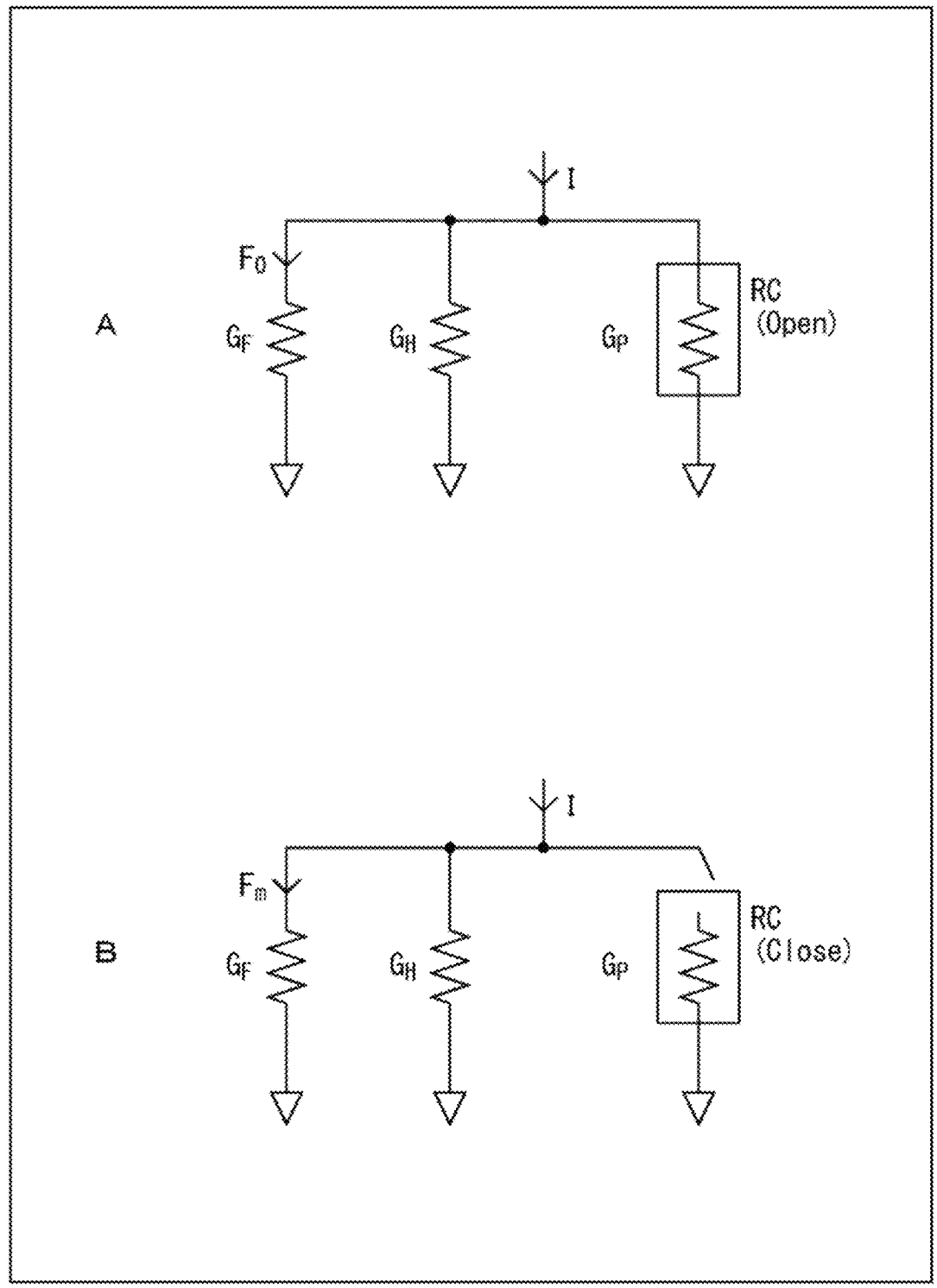
FIG. 7 is a diagram depicting a calculation algorism to calculate the quantum yield of the photosynthesis, represented by an electrical model.

FIG. 7 is a diagram depicting the calculation algorism to calculate the quantum yield (Fv/Fm) of the photosynthesis of the plant 1, using an electrical model.

FIG. 7 depicts that, in the case where the magnitude of the input light beam is represented by "I" and the degrees of absorption of the energy as the chlorophyll fluorescence, the heat, and the photochemical reaction are respectively represented by $G_F$, $G_H$, and $G_P$, I corresponds to an electric current, and $G_F$, $G_H$, and $G_P$ correspond to conductance elements connected in parallel to each other, for an electric circuit.

Especially, when the reaction center (RC) is in the open state, regarding the chlorophyll fluorescence ($F_0$) as an electric equivalent circuit, the chlorophyll fluorescence ($F_0$) can be represented by the equivalent circuit depicted in A of FIG. 7 and can therefore be represented as Equation (3) below.

[Math. 1]

$$F_0 = I \times \frac{G_F}{G_F + G_H + G_P} \quad (3)$$

On the other hand, when the reaction center (RC) is in the closed state, regarding the chlorophyll fluorescence ($F_m$) as an electric equivalent circuit, the chlorophyll fluorescence ($F_m$) can be represented by the equivalent circuit depicted in B of FIG. 7 and can therefore be represented as in Equation (4) below.

[Math. 2]

$$F_m = I \times \frac{G_F}{G_F + G_H} \quad (4)$$

From Equation (3) and Equation (4) above, the quantum yield (Fv/Fm) of the photosynthesis can therefore be represented as in Equation (5) below.

[Math. 3]

$$F_v/F_m = \frac{G_P}{G_F + G_H + G_P} \quad (5)$$

In Equation (5), however, the right side represents the ratio of the portion divided for the reaction center (RC), of the input light beam (I), that is, the yield.

(Supplement Concerning Pulse-Modulated Fluorescence Measurement)

Figure 8:
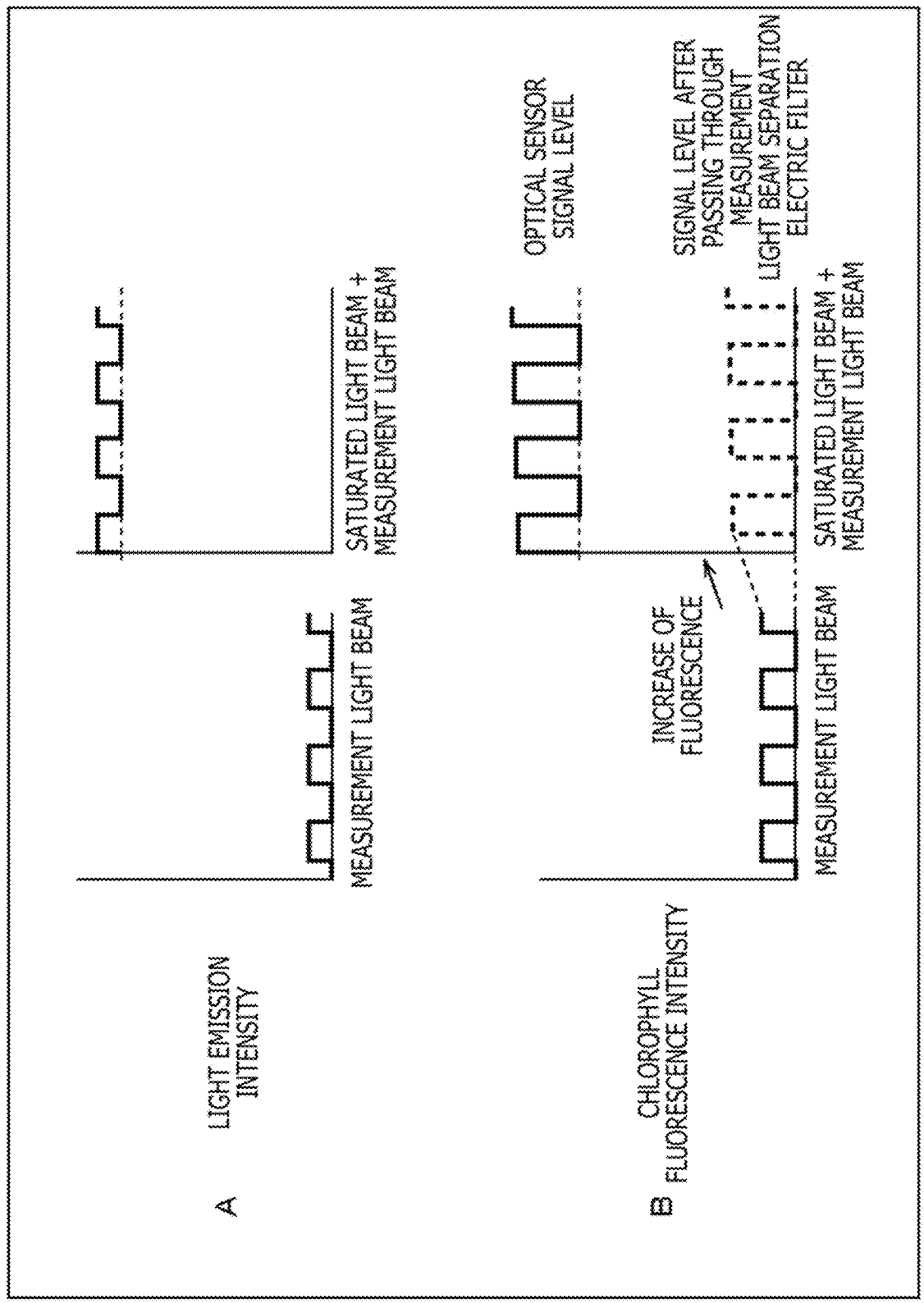
FIG. 8 is a diagram to explain supplement relating to the pulse-modulated fluorescence measurement.

FIG. 8 is a diagram to explain supplement relating to the pulse-modulated fluorescence measurement executed by the photosynthesis gauging apparatus 90 in FIG. 5.

In the photosynthesis gauging apparatus 90, the measurement light beam and the saturated light beam+the measurement light beam are used as the input light beam (I) to measure the chlorophyll fluorescence ($F_0$ and $F_m$). Concerning the above, as depicted in A of FIG. 8, in the measurement of the chlorophyll fluorescence ($F_m$), because the saturated light beam is applied in addition to the measurement light beam of AC, the response of the chlorophyll fluorescence is also measured in the form for the response to the saturated light beam (DC component) to be overlapped thereon.

As depicted in B of FIG. 8, however, because the response (DC component) of the chlorophyll fluorescence to the saturated light beam is removed by the action of the measurement light beam separation electric filter 907, the saturated light beam acts only for the effect that the state representable by the electrical model depicted in B of FIG. 7 above is established and does not influence the result of the sampling executed for the measurement light beam and the chlorophyll fluorescence executed by the sampling part 908, by setting the reaction center (RC) to be in the closed state. The quantum yield (Fv/Fm) of the photosynthesis can thereby be computed using the above algorism.

In this manner, the photosynthesis gauging apparatus 90 in FIG. 5 executes the pulse-modulated fluorescence measurement. Because the saturated light beam that is a significantly strong artificial light beam whose intensity substantially exceeds that of the sunlight is used in this pulse-modulated fluorescence measurement, in practice, however, the measurement in a limited area can be executed while the pulse-modulated fluorescence measurement is not suitable for the measurement in a wide-range area for which application of the saturated light beam is difficult in the case, for example, where plants in a farm field are the measurement target, and is not yet practically used at present.

It is therefore desired to enable the determination (diagnosis) of the state of the inside of a plant by determining the quantum yield of the photosynthesis without using the saturated light beam. In the present technique, therefore, one or plural transient model(s) each represent the photosynthesis of a plant is/are prepared, a calculation algorism in accordance with the transient model to be the target is applied to measurement data of a transient response of the chlorophyll fluorescence obtained from the plant to be measured, and the quantum yield of the photosynthesis that is an unknown parameter of the parameters relating to the transient model is thereby adapted to be estimated. The quantum yield of the photosynthesis is thereby enabled to be calculated without using the saturated light beam, and the state of the inside of the plant can therefore be determined (diagnosed).

(Parameter Estimation by Transient Model and Calculation Algorism)

Figure 9:
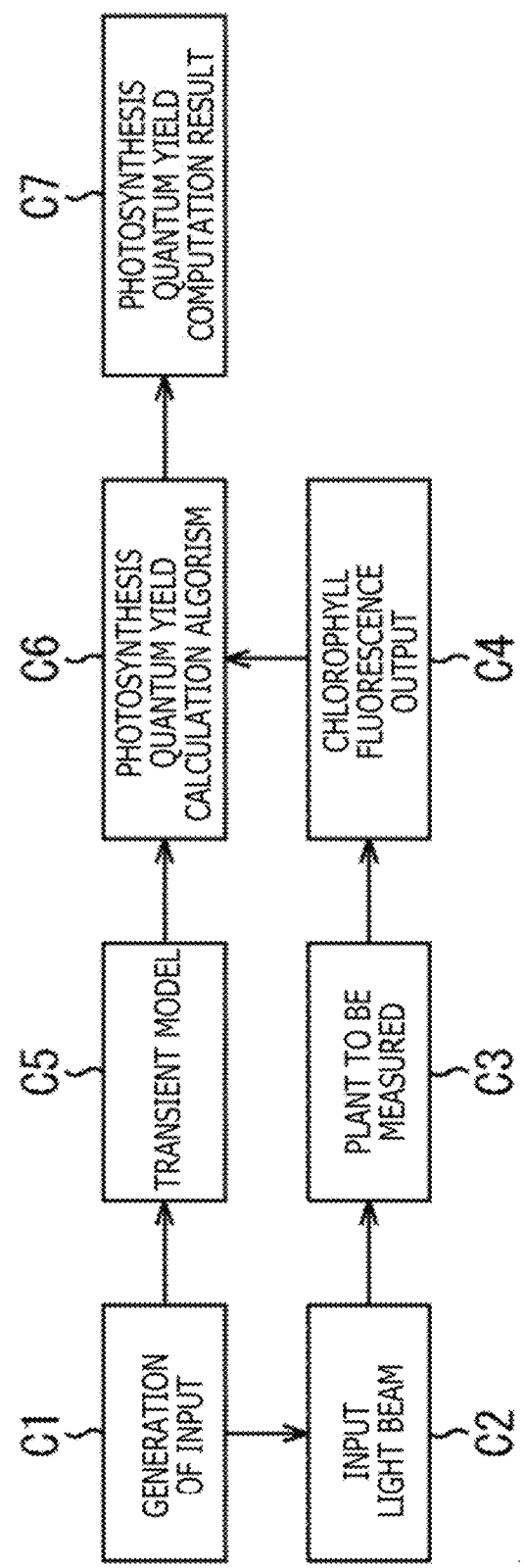
FIG. 9 is a diagram conceptually depicting parameter estimation that uses a transient model and a photosynthesis quantum yield calculation algorism of the present technique.

FIG. 9 is a diagram conceptually depicting parameter estimation that uses the transient model and the photosynthesis quantum yield calculation algorism of the present technique.

In FIG. 9, an input generation C1 represents the fact that an input light beam C2 such as, for example, the measurement light beam or a growing light beam is applied to a plant C3 to be measured. Moreover, the input generation C1 represents the fact that the transient model C5 is generated and is prepared in advance.

A chlorophyll fluorescence output C4 is the measurement data of the transient response of the chlorophyll fluorescence of the plant C3 to be measured, obtained by sampling the plant C3 to be measured to which the input light beam C2 is applied. The chlorophyll fluorescence output C4 becomes input data for the photosynthesis quantum yield calculation algorism C6.

The transient model C5 is a model that represents the electron transfer system of the photochemical reaction in the photosynthesis of the plant. A plant physiological model such as, for example, a puddle model, a lake model, or a connected unit model can be used as the transient model C5. In addition, one or plural transient model(s) can be prepared as the transient model C5.

Concerning the above, a gray box model is used as the approach for the modeling of the transient model C5. The gray box model is a model that is positioned in the middle of a white box model (a first principle model) and a black box model (system identification), and is a model whose having a system structure that is partially unknown.

For example, as to the gray box model, the unknown parameter is estimated from the input and output data (input data) on the basis of the first principle model of the target. For example, a technique disclosed in Japanese Laid-Open Patent No. 2011-137627 is present as a technique relating to the gray box. This literature discloses an approach of modeling the heat conduction in a building using the gray box model.

The photosynthesis quantum yield calculation algorism C6 is an algorism to calculate the quantum yield of the photosynthesis from the chlorophyll fluorescence output C4 using the transient model C5. One or plural algorism(s) can be prepared as the photosynthesis quantum yield calculation algorism C6, in accordance with, for example, the type of the transient model C5 and the quantum yield of the photosynthesis to be calculated (Fv/Fm or φPSII).

Concerning the above, the transient model C5 corresponds to the gray box model, and includes the quantum yield of the photosynthesis of the plant C3 to be measured as the unknown parameter of the plural parameters. The quantum yield of the photosynthesis of the plant C3 to be measured can therefore be calculated as the unknown parameter, by applying the photosynthesis quantum yield calculation algorism C6 in accordance with this transient model C5, to the chlorophyll fluorescence output C4 (the measurement data of the transient response of the chlorophyll fluorescence of the plant C3 to be measured) as the input data.

A photosynthesis quantum yield computation result C7 presents the fact that the quantum yields (Fv/Fm and φPSII) of the photosynthesis of the plant C3 to be measured are calculated as the computation result of the photosynthesis quantum yield calculation algorism C6.

As above, in the present technique, the quantum yield of the photosynthesis of the plant C3 to be measured is estimated (calculated) as the unknown parameter of the parameters relating to the transient model C5 by applying the photosynthesis quantum yield calculation algorism C6 in accordance with the transient model C5 to the chlorophyll fluorescence output C4. The first embodiment to the fifth embodiment will be described below as specific embodiments each to realize the parameter estimation that uses the transient model C5 and the photosynthesis quantum yield calculation algorism C6.

2. First Embodiment

The first embodiment will first be described with reference to FIG. 10 to FIG. 18.

(Example of Configuration of Photosynthesis Gauging Apparatus)

Figure 10:
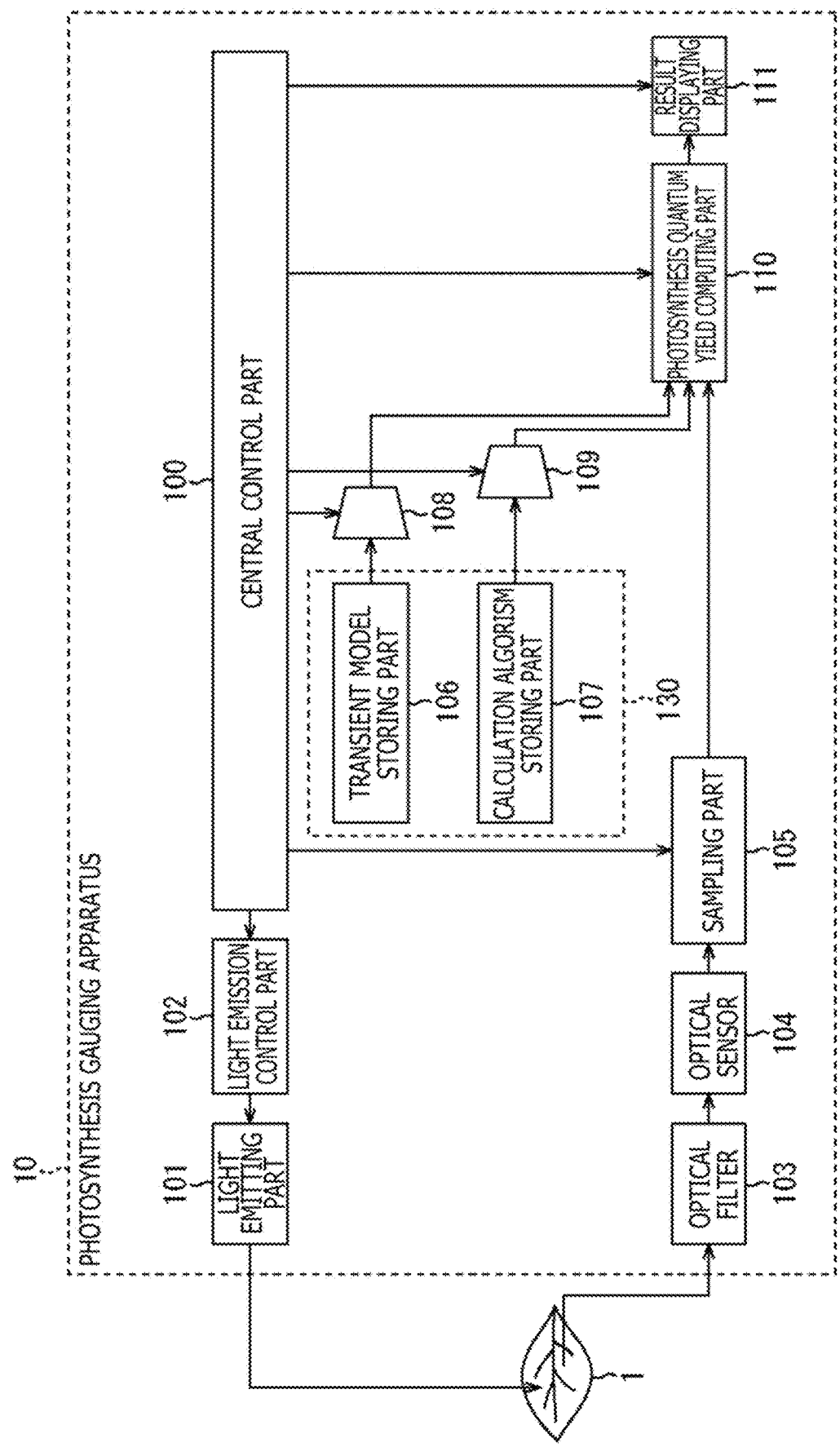
FIG. 10 is a diagram depicting an example of the configuration of a photosynthesis gauging apparatus of a first embodiment.

FIG. 10 is a diagram depicting an example of the configuration of a photosynthesis gauging apparatus 10 of the first embodiment.

The photosynthesis gauging apparatus 10 estimates (calculates) the quantum yield of the photosynthesis as the unknown parameter of the parameters relating to a transient model by applying a calculation algorism in accordance with the transient model that presents the photosynthesis of a plant to measurement data of a transient response of the chlorophyll fluorescence obtained from the plant 1 to be measured.

In FIG. 10, the photosynthesis gauging apparatus 10 includes a central control part 100, a light emitting part 101, a light emission control part 102, an optical filter 103, an optical sensor 104, a sampling part 105, a transient model storing part 106, a calculation algorism storing part 107, a selector 108, a selector 109, a photosynthesis quantum yield computing part 110, and a result displaying part 111.

The central control part 100 includes a circuit such as, for example, a CPU (Central Processing Unit) or an FPGA (Field Programmable Gate Array). The central control part 100 controls the operations of the components of the photosynthesis gauging apparatus 10. For example, the central control part 100 controls light emission control executed by the light emission control part 102, sampling executed by the sampling part 105, selection of the transient model executed by the selector 108, selection of the calculation algorism executed by the selector 109, and displaying of the result executed by the result displaying part 111.

The light emitting part 101 is, for example, a light emitting apparatus that emits (radiates) a light beam by an LED (Light Emitting Diode). The light emitting part 101 emits, for example, light beams having three types of intensity in accordance with the control from the light emission control part 102. The light beams emitted from the light emitting part 101 are applied to the plant 1. The light emission control part 102 controls the light emission intensity and the light emission sequence of each of the light beams emitted from the light emitting part 101 in accordance with the control from the central control part 100.

The optical filter 103 is a filter to separate the environmental light and the chlorophyll fluorescence from each other. For example, in the case where an artificial excitation light beam is applied to the plant 1, a bandpass filter or a lowpass filter for the wavelength separating the excitation light beam (a visible light beam) and the chlorophyll fluorescence (having a wavelength of approximately 680 to approximately 750 nm) from each other is used. Moreover, in the case where the measurement is executed under the sunlight, because the sunlight acts as the environmental light, a bandpass filter may be used that has a narrow wavelength band and that selectively transmits the fluorescence of the sun dark line (such as, for example, oxygen ($O_2$), having the absorbance band of 687 nm).

The optical sensor 104 is a one-dimensional or a two-dimensional sensor having the sensitivity for the wavelength of the chlorophyll fluorescence to measure (sense) the intensity of the chlorophyll fluorescence. The optical sensor 104 detects the light beam transmitted through the optical filter 103 using a sensing element and supplies a measurement signal (intensity value) of the chlorophyll fluorescence obtained as the result thereof to the sampling part 105.

Concerning the above, in the case where the one-dimensional sensing is aimed, for example, a sensing element having a photodiode mounted thereon is usable as the optical sensor 104. Moreover, in the case where the two-dimensional sensing is aimed, for example, an image sensor including a sensing element that has plural pixels two-dimensionally arranged therein in repeated patterns, such as a CMOS (Complementary Metal-Oxide Semiconductor) or a CCD (Charge Coupled Device), is usable as the optical sensor 104.

In addition, the "sensing" means measuring the plant 1 to be measured. Moreover, the "sensing" also includes the meaning of shooting the plant 1 to be measured.

In accordance with the control from the central control part 100, the sampling part 105 executes sampling for the measurement signal (intensity value) of the chlorophyll fluorescence from the optical sensor 104 and thereby converts the measurement signal of the chlorophyll fluorescence from the analog signal to a digital signal in order of elapse of time. The measurement data of the chlorophyll fluorescence obtained as the result of the sampling is supplied to the photosynthesis quantum yield computing part 110.

In addition, the measurement data obtained by the sampling is handled as one-dimensional or two-dimensional time-series measurement data of the chlorophyll fluorescence. Moreover, the measurement data can be established as any one of various formats of data such as, for example, image data in addition to the numerical data.

The transient model storing part 106 stores therein one or plural transient model(s). In accordance with the control from the central control part 100, the selector 108 selects a transient model to be used from the transient models stored in the transient model storing part 106 and supplies the transient model to be used to the photosynthesis quantum yield computing part 110.

The calculation algorism storing part 107 stores therein one or plural photosynthesis quantum yield calculation algorism(s). In accordance with the control from the central control part 100, the selector 109 selects a photosynthesis quantum yield calculation algorism to be used from the photosynthesis quantum yield calculation algorism(s) stored in the calculation algorism storing part 107 and supplies the photosynthesis quantum yield calculation algorism to be used to the photosynthesis quantum yield computing part 110.

In addition, the transient model storing part 106 and the calculation algorism storing part 107 are constituted as a storage part 130 that includes a semiconductor memory (such as, for example, a RAM (Random Access Memory)) or the like.

To the photosynthesis quantum yield computing part 110, the measurement data of the chlorophyll fluorescence from the sampling part 105, the transient model from the selector 108, and the photosynthesis quantum yield calculation algorism from the selector 109 are supplied. In this regard, the measurement data from the sampling part 105 includes the measurement data of the transient response of the chlorophyll fluorescence of the plant 1, obtained by changing the light beam applied to the plant 1.

The photosynthesis quantum yield computing part 110 calculates the quantum yield of the photosynthesis that is the unknown parameter of the parameters relating to the transient model by applying the photosynthesis quantum yield calculation algorism in accordance with the transient model that presents the photosynthesis of a plant, to the measurement data of the transient response of the chlorophyll fluorescence of the plant 1. The photosynthesis quantum yield computing part 110 supplies the calculated quantum yield of the photosynthesis to the result displaying part 111.

For example, at least one of the maximal quantum yield (Fv/Fm) of the electron transfer system of the photosynthesis or the quantum yield ($\phi$PSII) of the electron transfer system of the photosynthesis is calculated as the quantum yield of the photosynthesis.

The result displaying part 111 includes a display such as, for example, an LCD (Liquid Crystal Display) or an OELD (Organic Electroluminescence Display). In accordance with the control from the central control part 100, the result displaying part 111 displays the data (such as, for example, numerical data or image data) relating to the result of the computation for the quantum yield (Fv/Fm and/or $\phi$PSII) of the photosynthesis supplied from the photosynthesis quantum yield computing part 110.

In addition, in FIG. 10, all or some of the functions of the sampling part 105, the selector 108, the selector 109, and the photosynthesis quantum yield computing part 110 can be adapted to be realized by, for example, programs (software) executed by the central control part 100 constituted as a CPU.

Moreover, the result displaying part 111 and the storage part 130 have been described to be disposed inside the photosynthesis gauging apparatus 10 with reference to FIG. 10 while these components may be disposed in the exterior of the photosynthesis gauging apparatus 10 respectively as a displaying apparatus and a storage apparatus. In this case, the photosynthesis quantum yield computing part 110 needs to obtain the transient model and the calculation algorism from the external storage apparatus through a network. Moreover, the central control part 100 can cause the external displaying apparatus to display thereon and can cause the external storage apparatus to store therein, the data of the result of the computation for the quantum yield of the photosynthesis calculated by the photosynthesis quantum yield computing part 110.

The photosynthesis gauging apparatus 10 is configured as above.

(Relation Between Light Emission Intensity and Chlorophyll Fluorescence Intensity)

Figure 11:
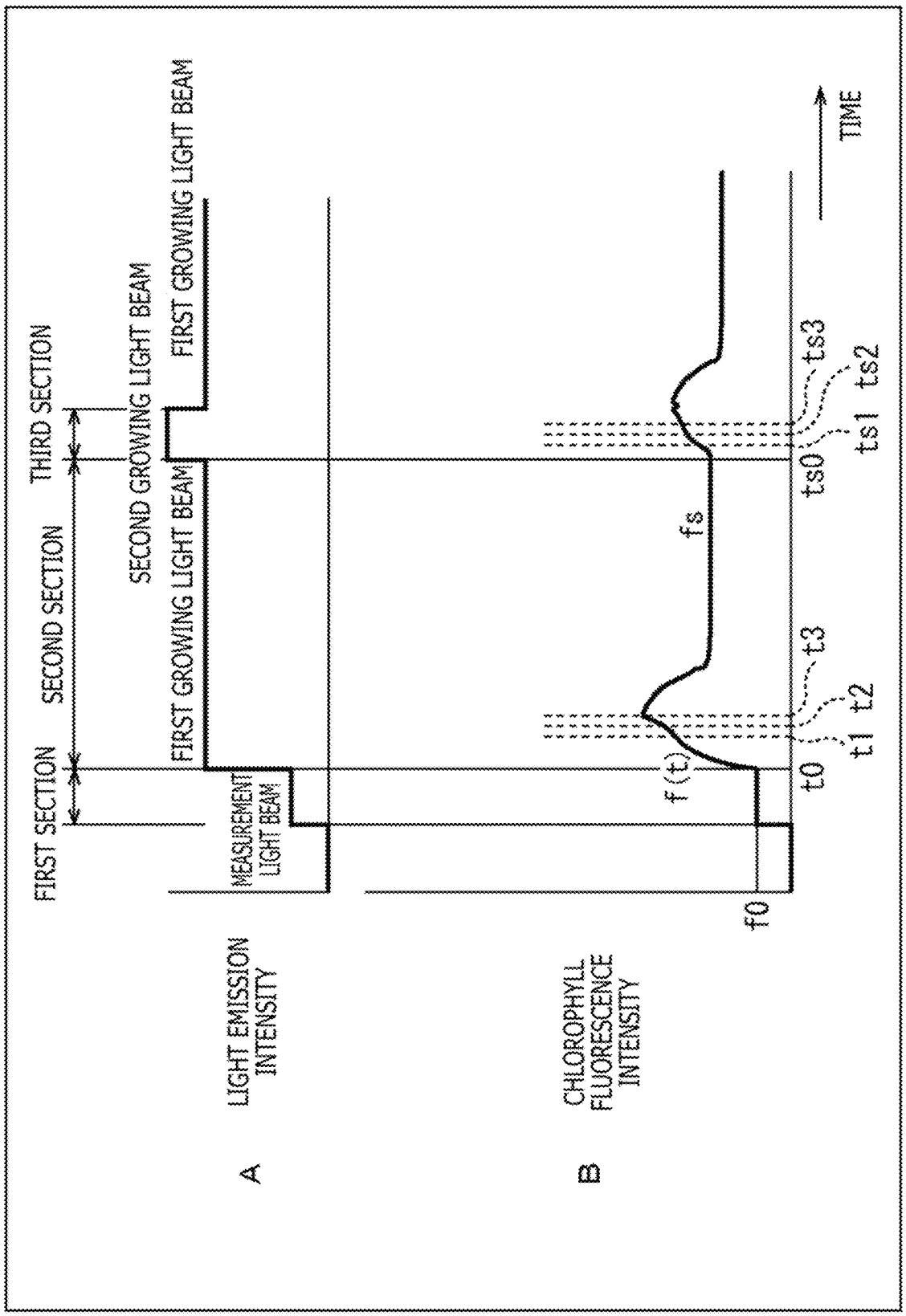
FIG. 11 is a diagram depicting the relation between the light emission intensity of each of the light beams applied to the plant and the intensity of the chlorophyll fluorescence.

Concerning the above, in the photosynthesis gauging apparatus 10 in FIG. 10, the sampling for the chlorophyll fluorescence of the plant 1 is executed changing the type of the light beam applied to the plant 1 while the relation as depicted in FIG. 11 is obtained by plotting the relation between the light emission intensity of the light beam applied to the plant 1 and the intensity of the chlorophyll fluorescence.

In this regard, in FIG. 11, the longitudinal direction represents the level of the intensity and it is represented that the level becomes higher at a position more upward in FIG. 11. Moreover, in FIG. 11, the lateral direction represents time and the direction of the time is set to be the direction from the left side toward the right side.

In FIG. 11, A of FIG. 11 depicts the intensity of the light beam emitted from the light emitting part 101 and B of FIG. 11 depicts the intensity of the chlorophyll fluorescence of the plant 1 caused by controlling the light beam emitted from the light emitting part 101.

In A of FIG. 11, three sections are present each in accordance with the type (intensity) of the light beam emitted from the light emitting part 101. The first section is the section for the measurement light beam that is a feeble light beam, to be emitted. For example, a light beam of approximately 10 [$\mu$mol/m$^2$/s] is emitted as the measurement light beam. Moreover, the second section is the section for a first growing light beam to be emitted, and the third section is the section for a second growing light beam that is a light beam whose intensity is higher than that of the first growing light beam, to be emitted. The growing light beams are the light beams each having the intensity used when a plant is grown, and the intensities thereof are each approximately 100 [$\mu$mol/m$^2$/s] as the minimal value. In this regard, the intensity of the second growing light beam is higher than that of the first growing light beam.

Concerning the above, in the case where Fv/Fm is gauged as the quantum yield of the photosynthesis, the gauging is generally started after the plant 1 is dark-acclimatized by placing the plant 1 in a dark state for a proper time period (such as, for example, 30 minutes or longer). When the gauging is started, the intensity of the light beam is varied by applying the measurement light beam in the first section and applying the first growing light beam in the second section succeeding the first section, and the measurement data of the chlorophyll fluorescence is thereby obtained.

In other words, as depicted in A of FIG. 11, in the case where the measurement light beam is applied in the first section and the first growing light beam is applied in the second section next to the first section, as depicted in B of FIG. 11, as to the intensity of the chlorophyll fluorescence, the level thereof substantially does not vary in the first section for the measurement light beam that is a feeble light beam, to be applied while the level thereof is increased immediately after the first growing light beam is applied in the second section.

For example, the photosynthesis gauging apparatus 10 causes the sampling part 105 to execute the sampling of the chlorophyll fluorescence at a time t0 in the first section (or the border between the first section and the second section) and at each of times (a time t1, a time t2, and a time t3) when the level of the intensity of the chlorophyll fluorescence is increased immediately after the first growing light beam is applied in the second section. In addition, the time t1, the time t2, the time t3 are set to satisfy the conditions that the time t0 is the starting point, that the 250 microseconds is the minimal value, and that 500 milliseconds is the maximal value.

The value of f0 and the values of f(t) (t=t1, t2, and t3) obtained by changing the light beam applied to the plant 1 (from the measurement light beam to the first growing light beam) can be obtained by this sampling as the measurement data of the transient response of the chlorophyll fluorescence of the plant 1. The photosynthesis quantum yield computing part 110 can thereafter calculate Fv/Fm on the basis of the measurement data of the transient response of the chlorophyll fluorescence (the values of the intensity level of the chlorophyll fluorescence). In sum, in this case, the quantum yield (Fv/Fm) in the dark-adapted state can be determines.

Moreover, in the case where the gauging of φPSII is executed as the quantum yield of the photosynthesis, the plant 1 generally needs to be placed in a light state for a proper time period (such as, for example, five minutes or longer). The measurement data of the chlorophyll fluorescence is therefore obtained by varying the intensity level of the light beam by continuously applying the first growing light beam in the second section and thereafter applying the second growing light beam in the third section.

In other words, as depicted in A of FIG. 11, in the case where the first growing light beam is continuously applied in the second section and the second growing light beam is applied in the third section next to the second section, as depicted in B of FIG. 11, the level of the intensity of the chlorophyll fluorescence substantially does not vary in the second section while the level thereof is increased immediately after the second growing light beam is applied in the third section.

For example, the photosynthesis gauging apparatus 10 gauges the sampling part 105 to execute the sampling of the chlorophyll fluorescence at a time ts0 in the second section (or the border between the second section and the third section) and at each of times (a time ts1, a time ts2, and a time ts3) when the level of the intensity of the chlorophyll fluorescence is increased immediately after the second growing light beam is applied in the third section. In addition, the time ts1, the time ts2, the time ts3 are set to satisfy the conditions that the time ts0 is the starting point, that the 250 microseconds is the minimal value, and that 500 milliseconds is the maximal value.

The value of fs and the value of f(t) (t=ts1, ts2, and ts3) obtained by changing the light beam applied to the plant 1 (from the first growing light beam to the second growing light beam) can be obtained by this sampling as the measurement data of the transient response of the chlorophyll fluorescence of the plant 1. The photosynthesis quantum yield computing part 110 can thereafter calculate φPSII on the basis of the measurement data of the transient response of the chlorophyll fluorescence of the plant 1 (the values of the intensity level of the chlorophyll fluorescence). In sum, in this case, the quantum yield (φPSII) obtained when the light beam having a specific intensity is applied for the photosynthesis to be performed can be determined.

In addition, the measurement data of the transient response of the chlorophyll fluorescence of the plant 1 is caused to be obtained by increasing (enhancing) the light emission intensity of the light beam in the light emission sequence of FIG. 11 while the point is that it is sufficient that the light emission intensity of the light beam is varied, and the measurement data of the transient response can also be obtained by, for example, reducing (weakening) the light emission intensity of the light beam.

(Photosynthesis Gauging Process)

The flow of a photosynthesis gauging process that is realized by the control executed by the central control part 100 in FIG. 10 for the components of the photosynthesis gauging apparatus 10 will be described next with reference to a flowchart in FIG. 12.

Figure 12:
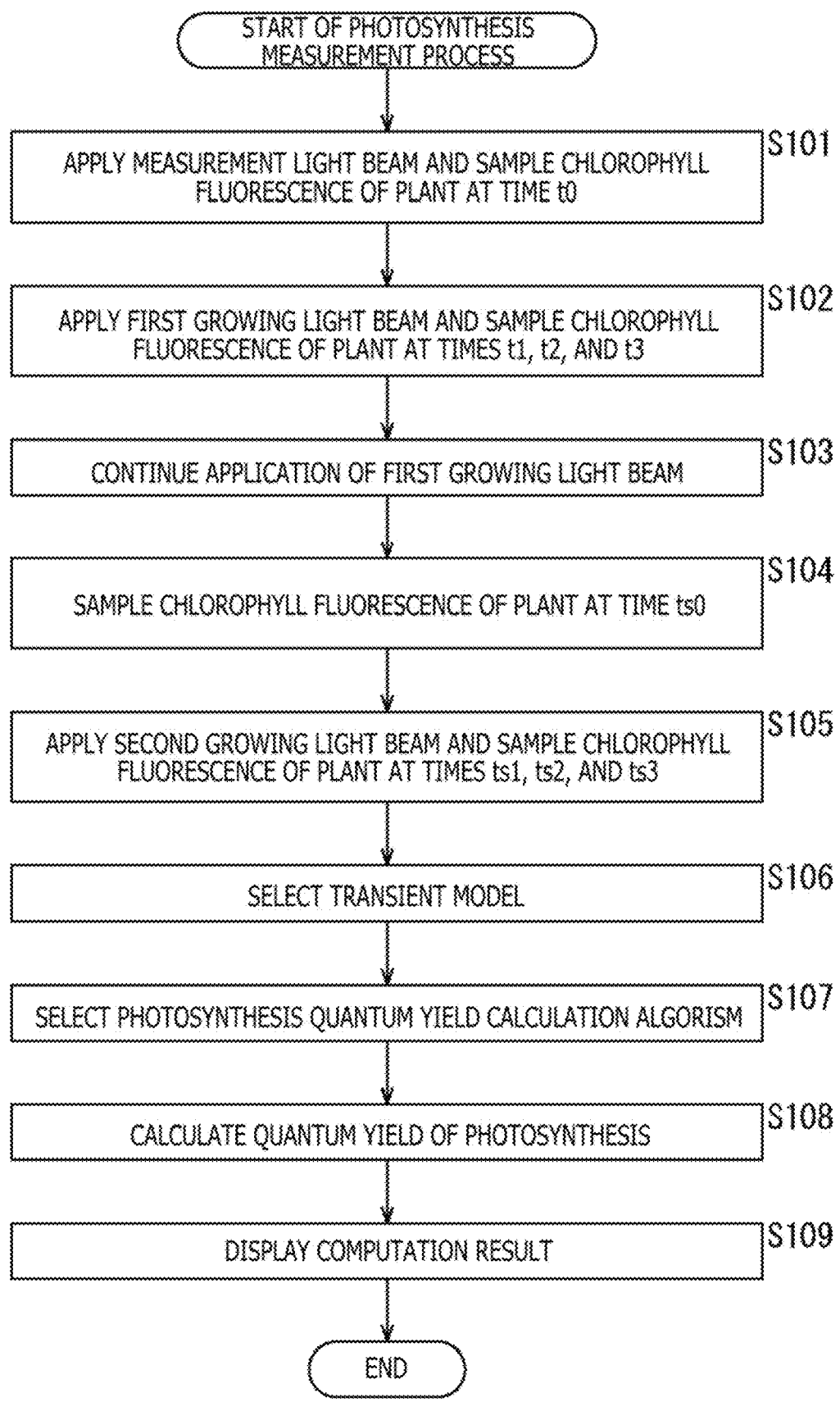
FIG. 12 is a flowchart explaining a photosynthesis gauging process.

In addition, it is assumed that, when the photosynthesis gauging process in FIG. 12 is executed, the plant 1 that is a higher plant is present at a position that enables the photosynthesis gauging apparatus 10 to execute the gauging. Moreover, for the timings of the light emission by the light emitting part 101 and the timings of the sampling by the sampling part 105, the description will properly be made with reference to FIG. 11.

At step S101, the central control part 100 controls the components to cause the measurement light beam to be applied to the plant 1 and to cause the sampling of the chlorophyll fluorescence to be executed at the timing of the time t0 in FIG. 11.

More specifically, the central control part 100 controls the light emission control part 102 to cause the measurement light beam to be applied from the light emitting part 101 to the plant 1. The measurement signal of the chlorophyll fluorescence from the plant 1 to which the measurement light beam is applied is thereby input from the optical sensor 104 into the sampling part 105.

Moreover, the central control part 100 controls the sampling part 105 to cause the sampling to be executed for the measurement signal of the chlorophyll fluorescence from the optical sensor 104. At the time t0 in FIG. 11, the measurement signal of the chlorophyll fluorescence of the plant 1 to which the measurement light beam is applied is thereby converted into the digital signal and the measurement data obtained as the result thereof is output to the photosynthesis quantum yield computing part 110.

At step S102, the central control part 100 controls the components to cause the first growing light beam to be applied to the plant 1 and to cause the sampling for the chlorophyll fluorescence to be executed at the timings of the time t1, the time t2, and the time t3 in FIG. 11.

More specifically, the central control part 100 controls the light emission control part 102 to cause the first growing light beam from the light emitting part 101 to be applied to the plant 1. The measurement signal of the chlorophyll fluorescence from the plant 1 to which the first growing light beam is applied is thereby input from the optical sensor 104 into the sampling part 105.

Moreover, the central control part 100 controls the sampling part 105 to cause the sampling to be executed for the measurement signal of the chlorophyll fluorescence from the optical sensor 104. At the time t1 in FIG. 11, the measurement signal of the chlorophyll fluorescence of the plant 1 to which the first growing light beam is applied is thereby converted into the digital signal and the measurement data obtained as the result thereof is output to the photosynthesis quantum yield computing part 110. At the timings of the time t2 and the time t3 in FIG. 11, the sampling is also executed similar to that at the timing of the time t1.

In this manner, in the case where the quantum yield (Fv/Fm) of the photosynthesis is calculated using the photosynthesis quantum yield calculation algorism that corresponds to the transient model, the value of f0 and the values of f(t) (t=t1, t2, and t3) in FIG. 11 that are necessary as the input data are obtained as the measurement data of the transient response of the chlorophyll fluorescence of the plant 1.

At step S103, the central control part 100 controls the light emission control part 102 to cause the application of the first growing light beam from the light emitting part 101 to be continued. In other words, the application of the first growing light beam to the plant 1 is started in the process of step S102 while the application of the first growing light beam to the plant 1 is also continued in the process of step S103.

At step S104, the central control part 100 controls the sampling part 105 to cause the sampling for the measurement signal of the chlorophyll fluorescence from the optical sensor 104, to be executed. At the time ts0 in FIG. 11, the measurement signal of the chlorophyll fluorescence of the plant 1 to which the first growing light beam is applied is thereby converted into the digital signal and the measurement data obtained as the result thereof is output to the photosynthesis quantum yield computing part 110.

At step S105, the central control part 100 controls the components to cause the second growing light beam to be applied to the plant 1 and to cause the sampling for the chlorophyll fluorescence to be executed at the timings of the time ts1, the time ts2, and the time ts3 in FIG. 11.

More specifically, the central control part 100 controls the light emission control part 102 to cause the second growing light beam from the light emitting part 101 to be applied to the plant 1. The measurement signal of the chlorophyll fluorescence from the plant 1 to which the second growing light beam is applied is thereby input from the optical sensor 104 into the sampling part 105.

Moreover, the central control part 100 controls the sampling part 105 to execute the sampling for the measurement signal of the chlorophyll fluorescence from the optical sensor 104. At the time ts1 in FIG. 11, the measurement signal of the chlorophyll fluorescence of the plant 1 to which the second growing light beam is applied is thereby converted into the digital signal and the measurement data obtained as the result thereof is output to the photosynthesis quantum yield computing part 110. Moreover, at the timings of the time ts2 and the time ts3 in FIG. 11, the sampling is also executed similar to that at the timing of the time ts1.

In this manner, in the case where the quantum yield ($\phi$PSII) of the photosynthesis is calculated using the photosynthesis quantum yield calculation algorism that corresponds to the transient model, the value of fs and the values of f(t) (t=ts1, ts2, and ts3) in FIG. 11 that are necessary as the input data are obtained as the measurement data of the transient response of the chlorophyll fluorescence of the plant 1.

At step S106, the central control part 100 controls the selector 108 to cause the transient model to be used for the gauging of the quantum yield of the photosynthesis to be selected from the one or the plural transient model(s) stored in the transient model storing part 106. In this case, in the case where the transient models such as, for example, a puddle model, a lake model, and a connected unit model are stored therein, the puddle model (a transient model thereof) can be selected.

In addition, the details of the transient models will be described later with reference to FIG. 13 and FIG. 14.

At step S107, the central control part 100 controls the selector 109 to cause the photosynthesis quantum yield calculation algorism that corresponds to the transient model selected in the process of step S106, to be selected from the one or the plural photosynthesis quantum yield calculation algorism(s) stored in the calculation algorism storing part 107. In the above, for example, in the case where the puddle model is selected as the transient model, the photosynthesis quantum yield calculation algorism for the puddle model can be selected.

At step S108, the central control part 100 controls the photosynthesis quantum yield computing part 110 to cause the quantum yield of the photosynthesis to be calculated by applying the photosynthesis quantum yield calculation algorism obtained in the process of step S107 to the measurement data of the transient response obtained in the processes of steps S101 to S105.

In the above, for example, the quantum yield (Fv/Fm) of the photosynthesis can be calculated by processing the measurement data of the transient response of the chlorophyll fluorescence of the plant 1 obtained in the processes of steps S101 and S102 (such as, for example, the value of f0 and the values of f(t) (t=t1, t2, and t3) in FIG. 11) as the input data in accordance with the photosynthesis quantum yield calculation algorism for the puddle model.

Moreover, for example, the quantum yield ($\phi$PSII) of the photosynthesis can be calculated by processing the measurement data of the transient response of the chlorophyll fluorescence of the plant 1 obtained in the processes of steps S103 to S105 (such as, for example, the value of fs and the values of f(t) (t=ts1, ts2, and ts3) in FIG. 11) as the input data in accordance with the photosynthesis quantum yield calculation algorism for the puddle model.

In addition, the flow from the measurement of the measurement data of the transient response of the chlorophyll response to the application of the photosynthesis quantum yield calculation algorism will be described later with reference to FIG. 15 to FIG. 17.

At step S109, the central control part 100 controls the result displaying part 111 to cause the computation result of the process of step S108 to be displayed on the result displaying part 111. The data relating to the computation result of the quantum yields (Fv/Fm and $\phi$PSII) of the photosynthesis is thereby displayed on the result displaying part 111.

The flow of the photosynthesis gauging process has been described as above.

In addition, the case where both of Fv/Fm and φPSII are calculated each as the quantum yield of the photosynthesis has been described for the photosynthesis gauging process in FIG. 12 while at least one of Fv/Fm or φPSII only has to be calculated as the quantum yield of the photosynthesis and the content of the sampling in the processes of steps S101 to S105 differs depending on the content of the quantum yield of the photosynthesis that is calculated in the process of step S108.

(Configuration of Transient Model)

The configuration of the transient model will next be described with reference to FIG. 13 and FIG. 14.

(Model of Reaction Center (RC))

A plant-physiological model such as, for example, a puddle model, a lake model, or a connected unit model is usable as the transient model. A of FIG. 13 depicts an example of the configuration of the model of the reaction center (RC) that corresponds to the puddle model.

Figure 13:
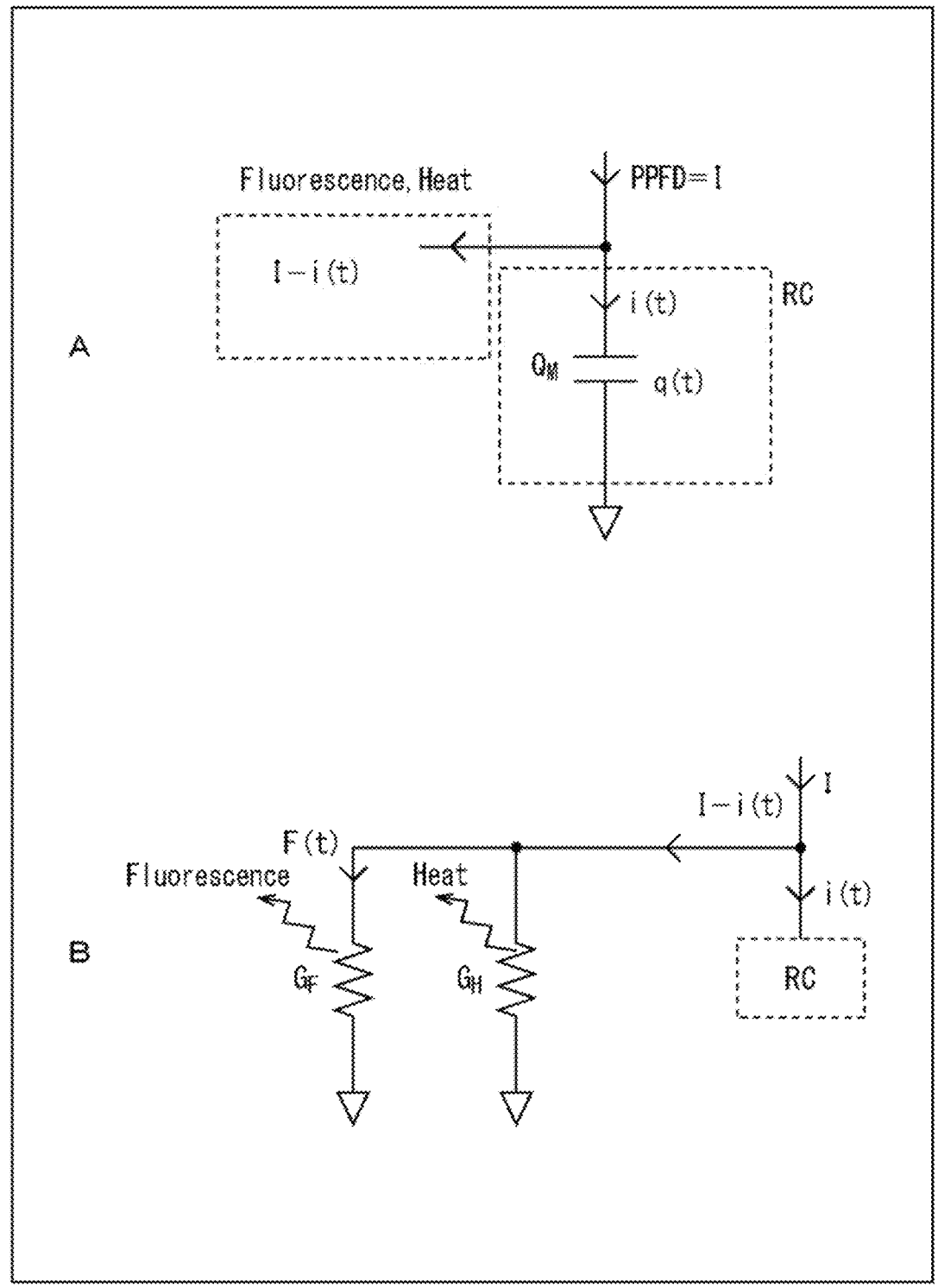
FIG. 13 is a diagram depicting the configuration of the transient model.

As depicted in A of FIG. 13, in the case where the magnitude of the input light beam (PPFD value) is represented by "I," taking the temporal element into consideration, the puddle model can be represented by an equivalent circuit according to which the reaction center (RC) preferentially obtains the photons that are input therein (converts the photons into electrons) and the photons unable to be obtained by the reaction center (RC) flow into the side of the chlorophyll fluorescence and the heat. In addition, the reaction center (RC) includes plural modules ($Q_A$, $Q_B$, PQ, and the like).

In other words, in the equivalent circuit in A of FIG. 13, the reaction center (RC) is represented as a capacitor and this capacitor accumulates the current (i(t)) corresponding to the photons preferentially input thereinto as a charge (q(t)). More over, in the case where the maximal charge storage amount of the capacitor of the reaction center (RC) is exceeded by the flowing-in of the current that corresponds to the photons to the side of the reaction center (RC), the current (I-i(t)) corresponding to the photons flows into the side of the fluorescence and the heat.

Concerning the above, the non-linear behavior of the reaction center (RC) depicted in A of FIG. 13 will be described with reference to probability calculation. In another words, assuming that the absorption into the reaction center (RC) is stochastically determined by multiplication of the input and the open rate, the property thereof is defined as in Equation (6) below.

[Math. 4]

$$i(t) = (I \times P_M) \times \frac{Q_M - q(t)}{Q_M} \quad (6)$$

In this regard, in Equation (6), ($I \times P_M$) that is the first term of the right side represents the input and ($Q_M - q(t))/Q_M$ that is the second term of the right side represents the open rate. Moreover, $P_M$ represents the yield in the open state (q(t)=0) and $Q_M$ represent the maximal charge storage amount of the reaction center (RC).

Concerning the above, for Equation (6), when i(t) is represented using q(t), i(t) can be represented as in Equation (7) below.

[Math. 5]

$$i(t) = \frac{dq(t)}{dt} = (I \times P_M) - \frac{I \times P_M}{Q_M} q(t) \quad (7)$$

Solving Equation (7) next, i(t) can be represented as in Equation (8) below.

[Math. 6]

$$i(t) = (I \times P_M) e^{-\frac{I \times P_M}{Q_M} t} \quad (8)$$

In addition, the description has been made taking the example of the puddle model in the case where the reaction center (RC) is a single body like the equivalent circuit depicted in A of FIG. 13 in the above description while the case can also be assumed where plural reaction centers (RCs) are present. In the above, in the case where the plural reaction centers (RCs) are present (in the case where a model per specific leaf area is considered), the model can be represented as in Equation (9) below.

[Math. 7]

$$i_{all}(t) = N \times (I \times P_M) \times \frac{Q_M - q(t)}{Q_M} \quad (9)$$

In this regard, in Equation (9), N represents the number of the reaction centers (RCs). Moreover, in the puddle model, Equation (8) and Equation (9) have no difference in the equation shape therebetween because the puddle model is a model for no energy between the reaction centers (RCs) to be shared thereby. In the description below, it therefore is also assumed that Equation (8) also substitutes in the case where the plural reaction centers (RCs) are present Concerning the above, FIG. 14 depicts an example of the result of a simulation of the transient model by the inventor of the present technique. FIG. 14 depicts waveforms of the chlorophyll response of the models in the case where photosynthesis having the theoretically maximal performance is performed, and the axis of abscissa is set to represent the time (unit: second) and the axis of ordinate represents the intensity of the fluorescence.

Figure 14:
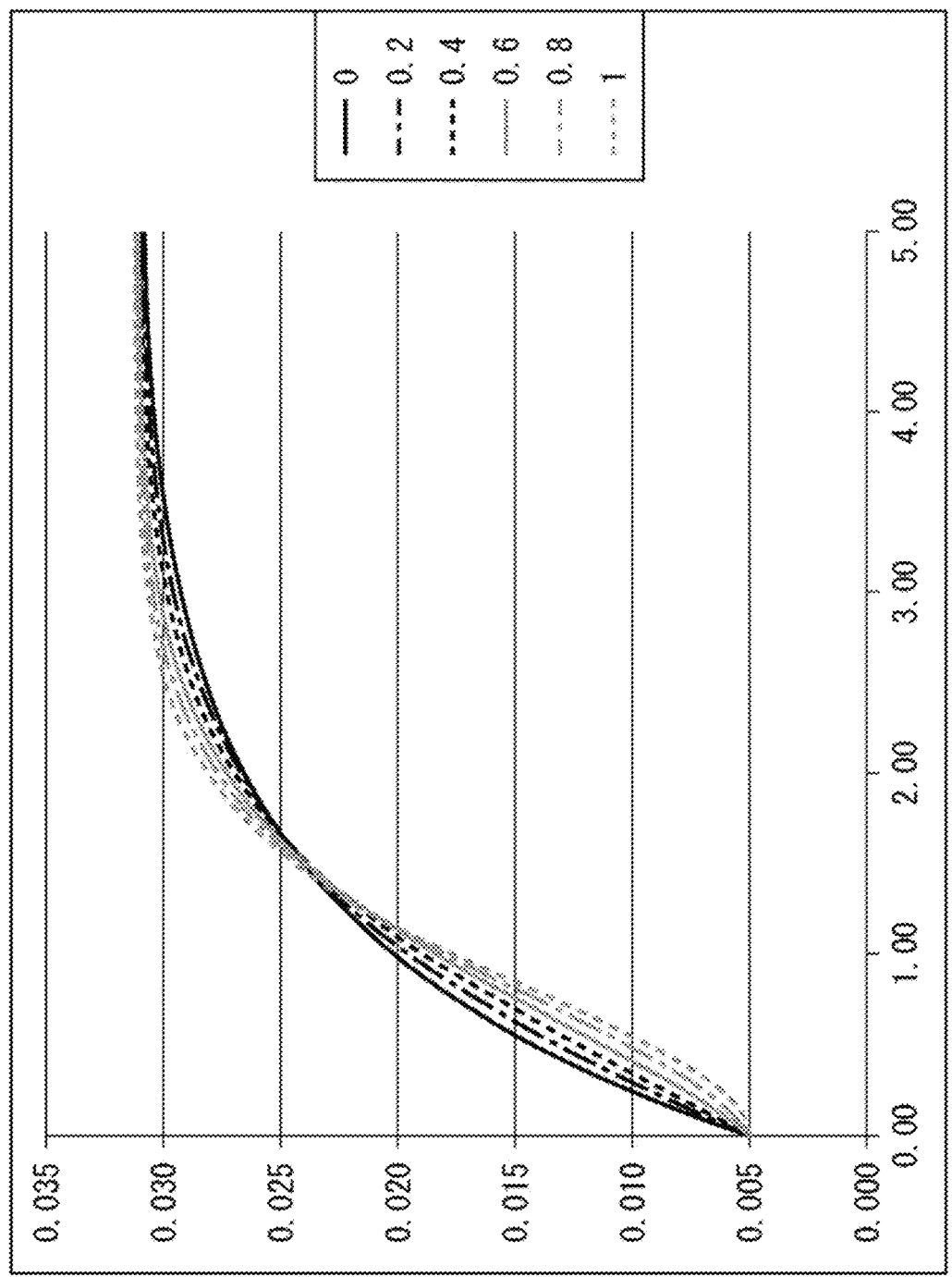
FIG. 14 is a graph depicting an example of the result of a simulation using the transient model.

In FIG. 14, of the six waveforms of the chlorophyll response, the waveform denoted by "0" corresponds to the puddle model. In the case of the puddle model, no energy transfer is executed among the reaction centers (RCs) and the waveform of the chlorophyll response has the shape of the natural logarithm.

Moreover, the four waveforms denoted by "0.2," "0.4," "0.6," and "0.8" each correspond to the connected unit model. In the case of the connected unit model, the energy transfer among the reaction centers (RCs) occurs at a fixed probability and the waveform of the chlorophyll response becomes a shape formed by combining the shape of the natural logarithm and the shape of a sigmoid function with each other.

Furthermore, the waveform denoted by "1" corresponds to the lake model. In the case of the lake model, the energy transfer among the reaction centers (RCs) occurs at the probability of 100% and the waveform of the chlorophyll response becomes the shape of the sigmoid function.

(Model of Chlorophyll Fluorescence)

Returning back to FIG. 13, B of FIG. 13 depicts an example of the configuration of a model of the chlorophyll fluorescence corresponding to the puddle model.

As depicted in B of FIG. 13, the modeling can be executed for the puddle model assuming that the energy unable to be transferred to the reaction center (RC) is released in the form of the chlorophyll fluorescence and heat. In other words, in the equivalent circuit in B of FIG. 13, in the case where the magnitude (PPFD value) of the input light beam input into the side of the chlorophyll fluorescence and the heat is represented by "I-i(t)" and the degrees of the energy absorbed as the chlorophyll fluorescence and the heat are respectively represented by "$G_F$" and "$G_H$," the fact is depicted that I-i(t) corresponds to a current, and $G_F$ and $G_H$ each correspond to conductance, that are connected in parallel to each other.

Concerning the above, the response (F(t)) of the chlorophyll fluorescence depicted in B of FIG. 13 can be represented by Equation (10) below.

[Math. 8]

$$F(t) = (I - i(t)) \times \frac{G_F}{G_F + G_H} \quad (10)$$

Concerning the above, when $F_0$ and $F_m$ in the measurement of the chlorophyll fluorescence described above (with reference to FIG. 7 and the like) are each represented using this model, $F_0$ and $F_m$ can be represented as in Equation (11) and Equation (12) below.

[Math. 9]

$$F_0 = (I - I \times P_M) \times \frac{G_F}{G_F + G_H} \quad (11)$$
$$= I \times (1 - P_M) \times \frac{G_F}{G_F + G_H}$$

[Math. 10]

$$F_m = I \times \frac{G_F}{G_F + G_H} \quad (12)$$

Concerning the above, because Fv/Fm is Fv/Fm=($F_m$−$F_0$)/$F_m$ from Equation (1) as above, substituting this in Equation (10) and Equation (11) gives Equation (13) below.

$$Fv/Fm = P_M \quad (13)$$

In other words, it can be stated that, from Equation (13), in this model of the chlorophyll fluorescence, the determination of Fv/Fm using the saturated light beam and the determination of $P_M$ using any other approach are equivalent to each other.

As above, in an ordinary electric circuit, in the case where the three output destinations are present such as the reaction center (RC), the chlorophyll fluorescence, and the heat as above, the energy is divided being influenced by the parameters of the three output elements as parallel circuits among each other. In the photosynthesis, however, an element referred to as "extraction time period of the excited energy" is present, and the "extraction time period" of the reaction center (RC) is quicker than those of the chlorophyll fluorescence and the heat. The energy is therefore preferentially distributed to the reaction center (RC) because of this temporal priority. The above described puddle model handles the rest of the energy, that is unable to be received by the reaction center (RC) as the energy to be distributed to the chlorophyll fluorescence and the heat each as an independent circuit.

The case where the puddle model is used as the transient model has been exemplified in the above description while the lake model or the connected unit model may be used. Moreover, not limiting to the puddle model, the lake model, and the connected unit model, any other plant-physiological model can be used as the transient model, such as, for example, an excess model that is the model for the case where the leaves of a plant are heavily damaged. Furthermore, because these models are each generally non-linear, not a parameter identification algorism using the analytical solution described in the embodiments of the present technique but a parameter identification algorism using a regression analysis may be used.

(Details of Photosynthesis Quantum Yield Calculation Algorism: Example of Approach Using Analytical Solution)

The details of the photosynthesis quantum yield calculation algorism will be described with reference to FIG. 15 to FIG. 17. In this section, first, the calculation algorism for the case where Fv/Fm is calculated as the quantum yield of the photosynthesis will first be described and the calculation algorism for the case where ϕPSII is calculated will thereafter be also described. In this regard, the photosynthesis quantum yield calculation algorism used in the case where the transient model corresponding to the above described puddle model is used will be described in this section.

(1) Calculation Algorism for Fv/Fm (Calculation Algorism for Fv/Fm)

"rFv" is defined as represented in Equation (14) below using F(t) and $F_0$.

[Math. 11]

$$rFv = \frac{F(t) - F_0}{F(t)} = 1 - \frac{F_0}{F(t)} \quad (14)$$

Concerning the above, when Equation (11) and Equation (8) are substituted in Equation (10) described above and the result thereof is simplified, Equation (14) can be represented as in Equation (15) below.

[Math. 12]

$$rFv = \frac{F(t) - F_0}{F(t)} = \frac{1 - e^{-\frac{I \times P_M}{Q_M}t}}{\frac{1}{P_M} - e^{-\frac{I \times P_M}{Q_M}t}} \quad (15)$$

When Equation (15) is thereafter simplified, the result thereof can be represented as in Equation (16).

[Math. 13]

$$P_M = \frac{rFv}{1 - e^{-\frac{I \times P_M}{Q_M}t} + rFv \times e^{-\frac{I \times P_M}{Q_M}t}} \quad (16)$$

In other words, according to the calculation algorism for Fv/Fm, "rFv" and "I×$P_M$/$Q_M$" are gauged and $P_M$ is calculated in accordance with the calculation algorism represented by Equation (16) (the photosynthesis quantum yield calculation algorism for the puddle model). In sum, the determination of Fv/Fm using the saturated light beam and the determination of $P_M$ using any other approach are equivalent to each other as above and, in this case, Fv/Fm is therefore determined as the quantum yield of the photosynthesis by calculating $P_M$ in accordance with the photosynthesis quantum yield calculation algorism for the puddle model.

(Calculation Algorism for Time Constant)

In this section, an algorism to calculate a time constant (k: $I \times P_M/Q_M$) in Equation (16) described above will be described.

The transient solution of an R, C, and L-equivalent circuit can generally be represented using the natural logarithm. It is assumed that the solution is represented by Equation (17) below.

[Math. 14]

$$f(t) = Ae^{-kt} \quad (17)$$

In the case where the solution is represented by Equation (17), the time constant (k) can be determined by applying first-order differentiation and second-order differentiation to Equation (17) and taking the ratios of the values obtained as the result thereof. In other words, the first-order differential and the second-order differential in this case are respectively represented by Equation (18) and Equation (19) below.

[Math. 15]

$$\frac{df(t)}{dt} = -kAe^{-kt} \quad (18)$$

[Math. 16]

$$\frac{d^2 f(t)}{dt^2} = k^2 Ae^{-kt} \quad (19)$$

Moreover, the time constant (k) is determined as represented by Equation (20) below using the ratios of the first-order differentiation represented by Equation (18) and the second-order differentiation represented by Equation (19).

[Math. 17]

$$\left(\frac{d^2 f(t)}{dt^2}\right) / \left(\frac{df(t)}{dt}\right) = -k \quad (20)$$

Concerning the above, the value of Equation (20) can be determined from the pieces of measurement data of three points. For example, as depicted in FIG. 15, in the case where the measurement data is represented by f(t), when the pieces of measurement data at the time t1, the time t2, and the time t3 are a, b, and c, the slope of the graph between the times t1 and t2, and the slope of the graph between the times t2 and t3 are represented as below.

In other words, the case where the time period from the time t1 to the time t2 and the time period from the time t2 to the time t3 are each represented by $\Delta t$, the slope of the graph between the times t1 and t2 is represented by $b-a/\Delta t = m$ and the slope of the graph between the times t2 and t3 is represented by $c-b/\Delta t = n$. In this case, the second-order differential represented by Equation (19) can be represented as $n-m/\Delta t = 1$ and above Equation (20) can therefore be represented as Equation (21) below.

[Math. 18]

$$k = -\left(\frac{d^2 f(t)}{dt^2}\right) / \left(\frac{df(t)}{dt}\right) \approx -\frac{l}{(m+n)/2} \quad (21)$$

In this manner, from the pieces of measurement data at the three points, the time constant (k) can be determined.

(Flow Up to Application of Calculation Algorism)

The flow from the measurement of the measurement data to the application of the calculation algorism for the case where Fv/Fm is calculated will be described with reference to FIG. 16.

Figure 16:
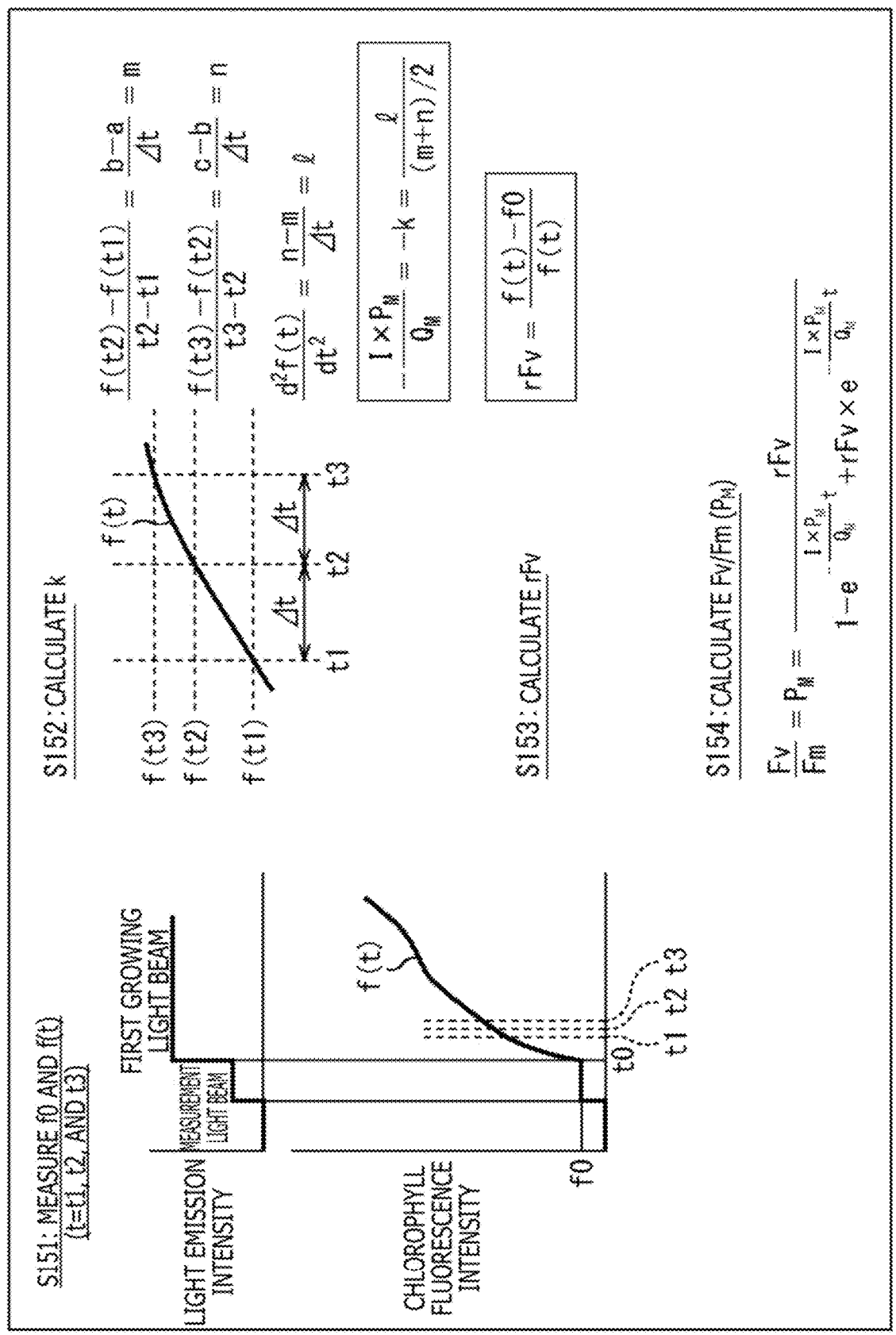
FIG. 16 is a diagram explaining a flow up to application of the calculation algorism in the case where Fv/Fm is calculated.

The photosynthesis gauging apparatus 10 (FIG. 10) executes the processes from the measurement of the measurement data of the transient response of the chlorophyll fluorescence of the plant 1 to the application of the photosynthesis quantum yield calculation algorism for the puddle model by executing the processes of steps S151 to S154 in FIG. 16. In addition, in this case, because Fv/Fm is calculated as the quantum yield of the photosynthesis, the light emission sequence presented at step S151 corresponds to the first section and a partial section of the second section in the light emission sequence in FIG. 11 described above.

The sampling part 105 first executes the sampling at the timings of the time t0, the time t1, the time t2, and the time t3, and the value of f0 and the values of f(t) (t=t1, t2, and t3) are thereby obtained as the measurement data of the transient response of the chlorophyll fluorescence of the plant 1 (S151).

Figure 15:
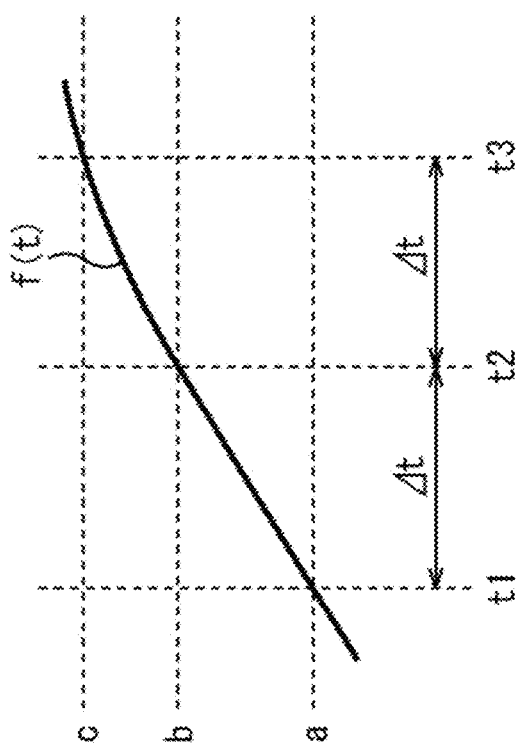
FIG. 15 is a diagram explaining the calculation algorism for a time constant.

The photosynthesis quantum yield computing part 110 next applies the measurement data of the transient response (the pieces of measurement data for the three points) from the sampling part 105, to Equation (21) using the approach depicted in FIG. 15 and can thereby calculate the time constant (k) (S152).

The photosynthesis quantum yield computing part 110 next applies the measurement data of the transient response from the sampling part 105 to Equation (14) and can thereby calculate rFv (S153).

The photosynthesis quantum yield computing part 110 applies the time constant (k) obtained in the process of step S152 and rFv obtained in the process of step S153 to Equation (22) below as the photosynthesis quantum yield calculation algorism for the puddle model and can thereby calculate $P_M$ (S154). It is as described above that $P_M$ determined in this manner corresponds to Fv/Fm as the quantum yield of the photosynthesis.

[Math. 19]

$$\frac{Fv}{Fm} = P_M = \frac{rFv}{1 - e^{-\frac{I \times P_M}{Q_M} t} + rFv \times e^{-\frac{I \times P_M}{Q_M} t}} \quad (22)$$

In this manner, Fv/Fm as the quantum yield of the photosynthesis can be determined. In addition, the value of F0 and the values of f(t) (t=t1, t2, and t3) are sampled in this example while, in principle, f0 at the time t0 and the value f(t1) at the time t1 can commonly be used.

(2) Calculation Algorism of φPSII

In the case where φPSII is calculated as the quantum yield of the photosynthesis, the calculation algorism for φPSII is used. Moreover, the time constant (k) also needs to be determined in the case where φPSII is calculated while the time constant (k) can be calculated using the approach depicted in FIG. 15 described above.

(Flow Up to Application of Calculation Algorism)

In this section, the flow from the measurement of the measurement data to the application of the calculation algorism (the photosynthesis quantum yield calculation algorism for the puddle model) for the case where φPSII is calculated, will be described with reference to FIG. 17.

Figure 17:
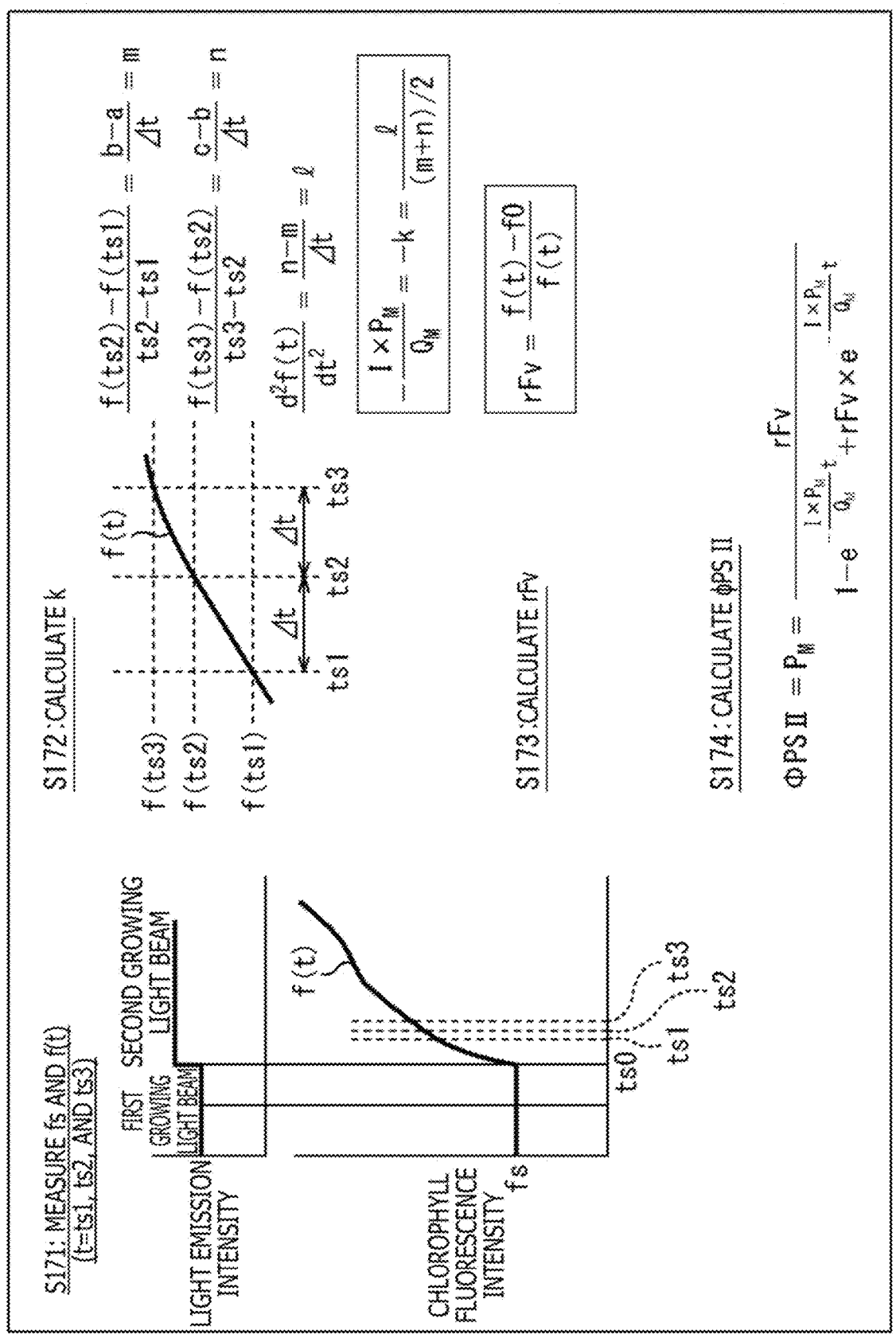
FIG. 17 is a diagram explaining a flow up to the application of the calculation algorism in the case where φPSII is calculated.

The photosynthesis gauging apparatus 10 (FIG. 10) executes the processes of steps S171 to S174 in FIG. 17 and thereby executes the processes from the measurement of the measurement data of the transient response of the chlorophyll fluorescence of the plant 1 to the application of the photosynthesis quantum yield calculation algorism for the puddle model. In addition, in this case, φPSII is calculated as the quantum yield of the photosynthesis and the light emission sequence presented at step S171 therefore corresponds to the second section and a partial section of the third section in the light emission sequence of FIG. 11 described above.

The sampling part 105 first executes sampling at the timings of the time ts0, the time ts1, the time ts2, and the time ts3, and the value of fs and the values of f(t) (t=ts1, ts2, and ts3) are thereby obtained as the measurement data of the transient response of the chlorophyll fluorescence of the plant 1 (S171).

The photosynthesis quantum yield computing part 110 can next calculate the time constant (k) on the basis of the measurement data of the transient response (the pieces of measurement data for the three points) from the sampling part 105 using the approach depicted in FIG. 15 described above (S172).

The photosynthesis quantum yield computing part 110 can next calculate rFv on the basis of the measurement data of the transient response from the sampling part 105 (S173).

The photosynthesis quantum yield computing part 110 thereafter applies the time constant (k) obtained in the process of step S172 and rFv obtained in the process of step S173 to Equation (24) below as the photosynthesis quantum yield calculation algorism for the puddle model and can thereby calculate φPSII (S174).

[Math. 20]

$$\phi PSII = P_M = \frac{rFv}{1 - e^{-\frac{I \times P_M}{Q_M}t} + rFv \times e^{-\frac{I \times P_M}{Q_M}t}} \quad (24)$$

In this manner, φPSII can be determined as the quantum yield of the photosynthesis.

As above, in the first embodiment, the measurement data of the transient response of the chlorophyll fluorescence is obtained by applying the measurement light beam and the growing light beam (steady light beam) to the plant 1, and the quantum yield of the photosynthesis can be calculated even without the saturated light beam by processing the measurement data as the input data in accordance with the photosynthesis quantum yield calculation algorism in accordance with the transient model such as the puddle model.

Concerning the above, when the light beams used in the measurement by the photosynthesis gauging apparatus 90 (FIG. 5) that employs the technique of the current state (pulse-modulated fluorescence measurement) and those used in the measurement by the photosynthesis gauging apparatus 10 (FIG. 10) employing the present technique are compared with each other, the result is as depicted in FIG. 18. In other words, in FIG. 18, for each of the schemes of the current state and the present technique, the light beams used in the measurement performed when the quantum yields (Fv/Fm and φPSII) of the photosynthesis to be gauged are presented by intensity.

In the scheme of the current state, as depicted in the light emission sequence in FIG. 6 described above, in the case where Fv/Fm is gauged, the two types of light beam of the measurement light beam and the saturated light beam are used. The intensity of the measurement light beam used in this case is set to be approximately 10 [μmol/m²/s]. Moreover, the intensity of the saturated light beam is set to be 2,000 [μmol/m²/s] or higher. The saturated light beam is also referred to as "saturated pulse light beam." In addition, in the case where Fv/Fm is gauged in the scheme of the current state, the steady light beam is unnecessary.

Moreover, in the case where φPSII is gauged in the scheme of the current state, the two types of light beam of the steady light beam and the saturated light beam are used. The intensity of the steady light beam used in this gauging is the intensity to be used to grow the plant 1 and is set to be approximately 100 [μmol/m²/s] as the minimal value. Moreover, in this gauging, the intensity of the saturated light beam is also set to be 2,000 [μmol/m²/s] or higher. In addition, in the case where φPSII is gauged in the scheme of the current state, the measurement light beam is unnecessary.

On the other hand, in the scheme of the present technique, as depicted in the light emission sequence in FIG. 11 described above, in the case where Fv/Fm is gauged, the two types of light beam of the measurement light beam and the growing light beam (first growing light beam) are used. The intensity of the measurement light beam used in this gauging is set to be approximately 10 [μmol/m²/s]. The intensity of the first growing light beam is the intensity to be used to grow the plant 1 and is set to be approximately 100 [μmol/m²/s] as the minimal value. The first growing light beam is also referred to as "first steady light beam." In addition, in the case where Fv/Fm is gauged in the scheme of the present technique, the saturated light beam is unnecessary.

Moreover, in the case where φPSII is measured in the scheme of the present technique, the two types of growing light beam (the first growing light beam and the second growing light beam) are used. The intensities of the first growing light beam and the second growing light beam used in this gauging are the intensities to be used to grow the plant 1 and are each set to be approximately 100 [μmol/m²/s] as the minimal value. In this regard, the intensity of the second growing light beam is set to be higher than the intensity of the first growing light beam (the first growing light beam<the second growing light beam). The second growing light beam is also referred to as "second steady light beam." In addition, in the case where φPSII is gauged in the scheme of the present technique, the measurement light beam and the saturated light beam are unnecessary.

As above, in the scheme of the current state, the saturated light beam is necessary for both of the gauging of Fv/Fm and the gauging of φPSII. On the other hand, in the scheme of the present invention, the saturated light beam is unnecessary for both of the gauging of Fv/Fm and the gauging of φPSII. In the photosynthesis gauging apparatus 10 (FIG. 10) employing the present technique, a low output per unit area of the light emitting apparatus (light emitting part) necessary for the measurement is therefore sufficient compared to that of the photosynthesis gauging apparatus 90 (FIG. 5) employing the technique in the current state (pulse-modulated fluorescence measurement), and the measurement in wider range is thereby enabled.

3. Second Embodiment (Example of Configuration of Photosynthesis Gauging Apparatus)

Figure 19:
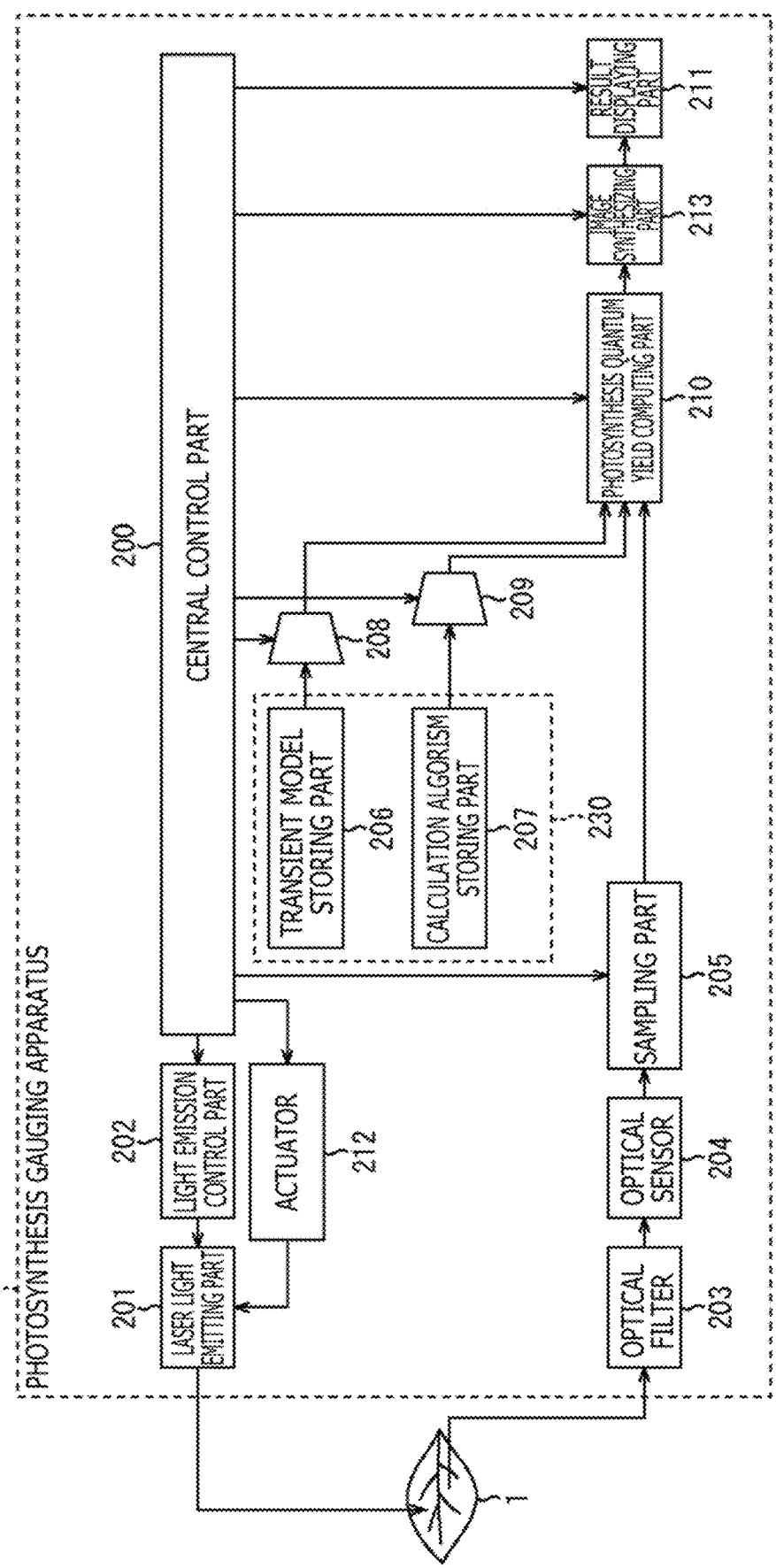
FIG. 19 is a diagram depicting an example of the configuration of a photosynthesis gauging apparatus of a second embodiment.

FIG. 19 is a diagram depicting an example of the configuration of a photosynthesis gauging apparatus 20 of the second embodiment.

In FIG. 19, the photosynthesis gauging apparatus 20 includes a central control part 200, a laser light emitting part 201, a light emission control part 202, an optical filter 203, an optical sensor 204, a sampling part 205, a transient model storing part 206, a calculation algorism storing part 207, a selector 208, a selector 209, a photosynthesis quantum yield computing part 210, a result displaying part 211, an actuator 212, and an image synthesizing part 213. In this regard, the transient model storing part 206 and the calculation algorism storing part 207 are constituted as a storage part 230 that includes a semiconductor memory or the like.

Compared to the photosynthesis gauging apparatus 10 in FIG. 10, the photosynthesis gauging apparatus 20 in FIG. 19 differs therefrom in the point that the laser light emitting part 201 is disposed therein instead of the light emitting part 101, and the actuator 212 and the image synthesizing part 213 are newly disposed therein. In addition, the configuration except the above of the photosynthesis gauging apparatus 20 is basically similar to the configuration of the photosynthesis gauging apparatus 10, and will therefore properly not again be described.

In accordance with the control from the light emission control part 202, the laser light emitting part 201 emits (radiates) laser light beams of, for example, three levels of intensity (the measurement light beam, the first growing light beam, and the second growing light beam). The actuator 212 has a function of scanning a predetermined area of the plant 1 to be measured, using the laser light beams emitted from the laser light emitting part 201.

The chlorophyll fluorescence of the plant 1 to which the laser light beam is applied is detected by the optical sensor 204 constituted as a two-dimensional sensor through the optical filter 203. Sampling of the measurement signal (intensity value) of the chlorophyll fluorescence from the optical sensor 204 is thereafter executed by the sampling part 205.

The photosynthesis quantum yield computing part 210 calculates the quantum yields (Fv/Fm and $\phi$PSII) of the photosynthesis that each are the unknown parameter of the parameters relating to the transient model by applying the photosynthesis quantum yield calculation algorism in accordance with the transient model that presents the photosynthesis of a plant, to the measurement data of the transient response of the chlorophyll fluorescence of the plant 1. In this regard, in the photosynthesis quantum yield computing part 210, the quantum yield of the photosynthesis is calculated for each scanning by the laser light beam and is supplied to the image synthesizing part 213.

In accordance with the control from the central control part 200, the image synthesizing part 213 synthesizes the quantum yield of the photosynthesis obtained for each scanning by the laser light beam to generate one image. The image generated by the image synthesizing part 213 is displayed on the result displaying part 211.

The photosynthesis gauging apparatus 20 is configured as above.

(Photosynthesis Gauging Process)

The photosynthesis gauging process executed by the photosynthesis gauging apparatus 20 in FIG. 19 is basically similar to the photosynthesis gauging process (FIG. 12) described above but differs therefrom in the point that the light beam applied to the plant 1 is the laser light beam. In other words, the laser light beam from the laser light emitting part 201 (FIG. 19) is used instead of the light beam from the light emitting part 101 (FIG. 10) by an LED or the like when the sampling is executed in the processes of steps S101 to S105 in FIG. 12.

As above, in the second embodiment, the measurement data of the transient response of the chlorophyll fluorescence is obtained by executing the scanning by the laser light beam for the plant 1, and the quantum yield of the photosynthesis can be calculated even without the saturated light beam by processing the measurement data as the input data in accordance with the photosynthesis quantum yield calculation algorism in accordance with the transient model such as the puddle model.

Concerning the above, a technique disclosed in Japanese Translations of PCT for Patent No. 2006-504956 is present as a technique of gauging the quantum yield of the photosynthesis using a laser light beam. In this literature, an apparatus is disclosed that executes two-dimensional gauging for the quantum yield of the photosynthesis by moving a beam of the laser light to thereby scan the chlorophyll fluorescence using a camera for each dot.

More specifically, according to the technique disclosed in this literature, a plant material is scanned using a laser light beam of approximately 1 Hz to approximately 10 kHz (that is, one second to 0.1 millisecond per dot) referred to as "Ffast gauging" and is thereafter scanned using a laser light beam of approximately 0.01 to approximately 1 Hz (that is, 100 seconds to one second per dot) referred to as "Fslow gauging." The quantum yield of the photosynthetic activity (an imaging quantum yield of photosynthesis (IQP)) is thereafter computed in accordance with Equation (25) below.

$$IQP = (Fslow - Ffast)/Fslow \quad (25)$$

In the technique disclosed in this literature, the gauging for one dot needs one second or longer and a long time is therefore necessary for the gauging in the case where the resolution is tried to be improved. For example, in the case where gauging is executed for a farm field of 100 m$^2$ (10 m×10 m) by executing measurement at 1,000 points in each of the longitudinal direction and the lateral direction thereof, 278 hours are necessary while, in the case where the present technique is used, when two-dimensionally arranged sensing elements are used as the optical sensor 104, points corresponding to one image can be gauged at one time and the gauging can be finished within 500 milliseconds as the maximal value.

Moreover, according to this literature, a calculation equation that is Fv/Fm=(Fm−F0)/Fm is defined to determine the quantum yield of the photosynthetic activity in the calculation equation of Equation (25) above, and it can therefore be considered that a laser light beam having an intensity of the saturated light beam needs to be used for the measurement of Fm while, in the case where the present technique is used, the intensity of the laser light beam can be reduced and it can be considered that the present technique has superiority from the viewpoint of the safety standards of the laser light beam.

On the other hand, the photosynthesis gauging apparatus 30 (FIG. 19) of the second embodiment also uses the laser light beam as the light beam to be applied to the plant 1 but, compared to the technique disclosed in the above literature, can execute the measurement without using the saturated light beam. A low output per unit area of the laser light emitting part 201 is therefore sufficient and the safety is therefore improved for open-air measurement and, in addition, the time period necessary for the measurement can be reduced.

4. Third Embodiment (Example of Configuration of Photosynthesis Gauging Apparatus)

Figure 20:
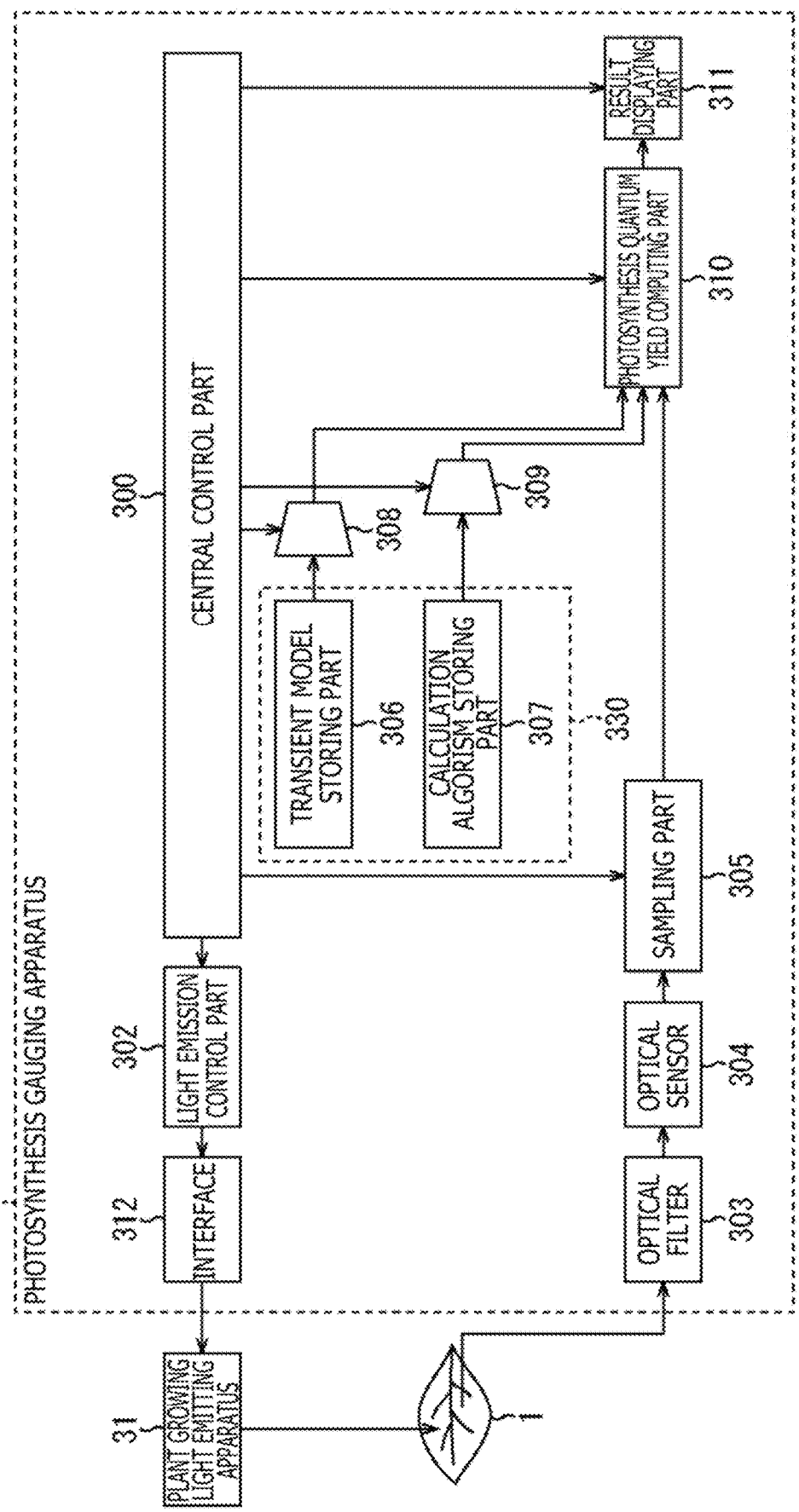
FIG. 20 is a diagram depicting an example of the configuration of a photosynthesis gauging apparatus of a third embodiment.

FIG. 20 is a diagram depicting an example of the configuration of the photosynthesis gauging apparatus 30 of the third embodiment.

In FIG. 20, the photosynthesis gauging apparatus 30 includes a central control part 300, a light emission control part 302, an optical filter 303, an optical sensor 304, a sampling part 305, a transient model storing part 306, a calculation algorism storing part 307, a selector 308, a selector 309, a photosynthesis quantum yield computing part 310, a result displaying part 311, and an interface 312. In this regard, the transient model storing part 306 and the calculation algorism storing part 307 are constituted as a storage part 330 that includes a semiconductor memory or the like.

Compared to the photosynthesis gauging apparatus 10 in FIG. 10, the photosynthesis gauging apparatus 30 in FIG. 20 differs therefrom in the point that the interface 312 to connect to an external apparatus is disposed therein instead of the light emitting part 101. In addition, in the photosynthesis gauging apparatus 30, the configuration other than the above is basically similar to the configuration of the photosynthesis gauging apparatus 10 and will therefore properly not again be described.

The interface 312 includes an input and output interface circuit and the like, and is adapted to be connectable to an external plant growing light emitting apparatus 31. The plant growing light emitting apparatus 31 is an apparatus that emits a light beam to grow a plant such as, for example, a light beam by an LED. In sum, because the sunshine for the plant may be insufficient to influence the growth thereof depending on the environment, the light beam emitted by an LED or the like is applied by the plant growing light emitting apparatus 31 for a specific time period and, thereby, the light beam having the wavelength necessary for the photosynthesis can efficiently be applied and the growth of the plant can be advanced.

The light emission control part 302 controls the light beam emitted from the plant growing light emitting apparatus 31, through the interface 312. In accordance with the control from the light emission control part 302, the plant growing light emitting apparatus 31 emits (radiates) light beams having, for example, three levels of intensity (the measurement light beam, the first growing light beam, and the second growing light beam).

The chlorophyll fluorescence of the plant to which the light beam from the plant growing light emitting apparatus 31 is applied is detected by the optical sensor 304 through the optical filter 303. Sampling of the measurement signal (intensity value) of the chlorophyll fluorescence from the optical sensor 304 is thereafter executed by the sampling part 305.

The photosynthesis quantum yield computing part 310 calculates the quantum yields (Fv/Fm and ϕPSII) of the photosynthesis that each are the unknown parameter of the parameters relating to the transient model by applying the photosynthesis quantum yield calculation algorism in accordance with the transient model that presents the photosynthesis of a plant, to the measurement data of the transient response of the chlorophyll fluorescence of the plant 1. The result of the computation by the photosynthesis quantum yield computing part 310 is displayed on the result displaying part 311.

The photosynthesis gauging apparatus 30 is configured as above.

(Photosynthesis Gauging Process)

The photosynthesis gauging process executed by the photosynthesis gauging apparatus 30 in FIG. 20 is basically similar to the photosynthesis gauging process (FIG. 12) described above but differs therefrom in the point that the light beam to be applied to the plant 1 is applied by the external plant growing light emitting apparatus 31. In other words, a light beam by an LED or the like from the plant growing light emitting apparatus 31 (FIG. 20) is used instead of the light beam by an LED or the like from the light emitting part 101 (FIG. 10) when the sampling is executed in the processes of steps S101 to S105 in FIG. 12.

As above, in the third embodiment, the measurement data of the transient response of the chlorophyll fluorescence is obtained by applying the light beam from the external plant growing light emitting apparatus 31 to the plant 1, and the quantum yield of the photosynthesis can be calculated even without the saturated light beam by processing the measurement data as the input data in accordance with the photosynthesis quantum yield calculation algorism in accordance with the transient model such as the puddle model.

Moreover, because the light beam to be applied to the plant 1 is adapted to be emitted from the external plant growing light emitting apparatus 31 in the third embodiment, the quantum yield of the photosynthesis can be determined on the side of the photosynthesis gauging apparatus 30 without preparing any special light source to execute the gauging for the photosynthesis.

5. Fourth Embodiment (Example of Configuration of Photosynthesis Gauging Apparatus)

Figure 21:
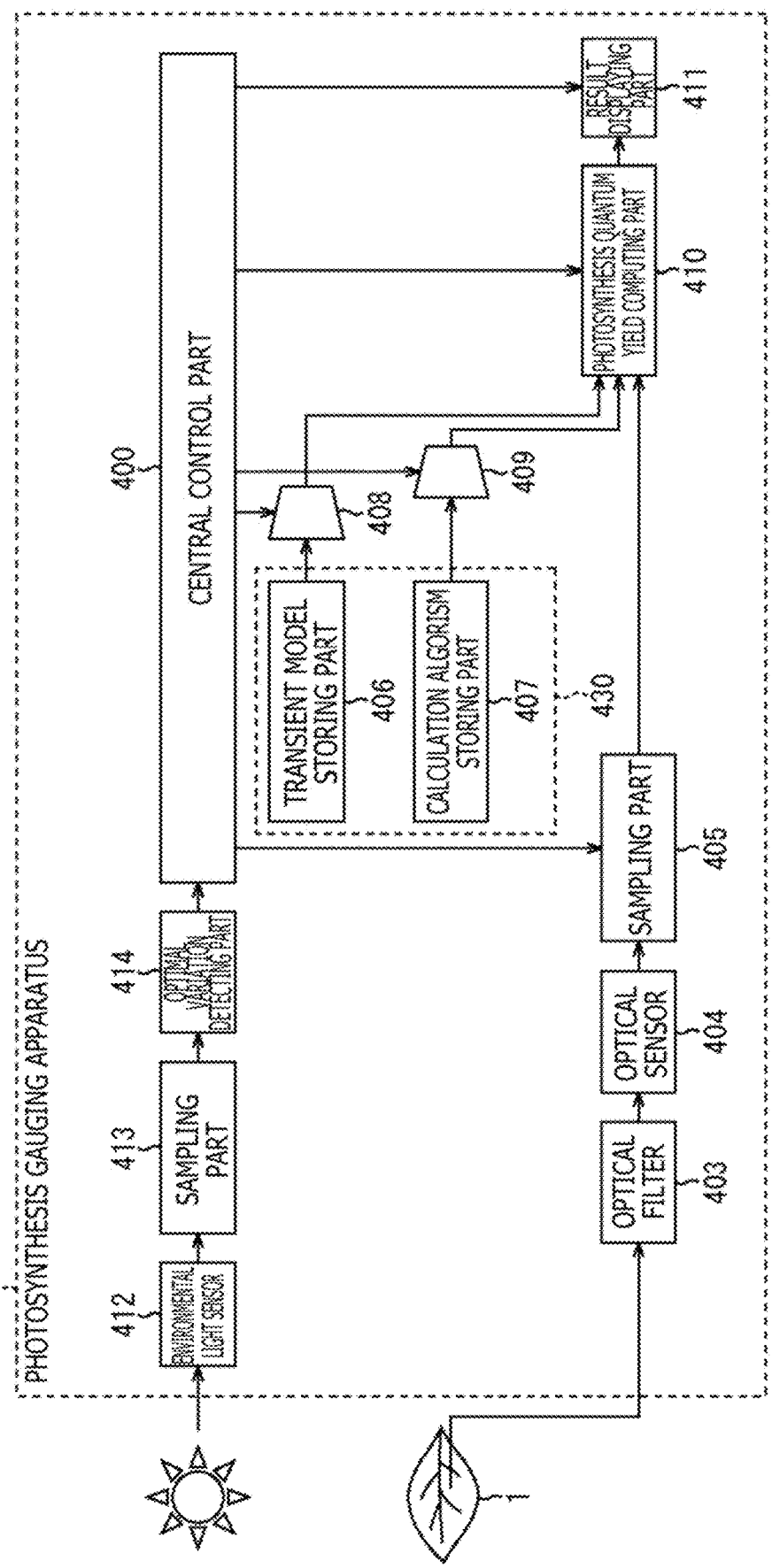
FIG. 21 is a diagram depicting an example of the configuration of a photosynthesis gauging apparatus of a fourth embodiment.

FIG. 21 is a diagram depicting an example of the configuration of a photosynthesis gauging apparatus 40 of the fourth embodiment.

In FIG. 21, the photosynthesis gauging apparatus 40 includes a central control part 400, an optical filter 403, an optical sensor 404, a sampling part 405, a transient model storing part 406, a calculation algorism storing part 407, a selector 408, a selector 409, a photosynthesis quantum yield computing part 410, a result displaying part 411, an environmental light sensor 412, a sampling part 413, and an optimal variation detecting part 414. In this regard, the transient model storing part 406 and the calculation algorism storing part 407 are constituted as a storage part 430 that includes a semiconductor memory or the like.

Compared to the photosynthesis gauging apparatus 10 in FIG. 10, the photosynthesis gauging apparatus 40 in FIG. 21 differs therefrom in the point that the environmental light sensor 412, the sampling part 413, and the optimal variation detecting part 414 are disposed therein instead of the light emitting part 101 and the light emission control part 102. In addition, in the photosynthesis gauging apparatus 40, the configuration other than the above is basically similar to the configuration of the photosynthesis gauging apparatus 10 and will therefore properly not again be described.

The environmental light sensor 412 is a sensor to measure the intensity of the environmental light such as the sunlight. The environmental light sensor 412 supplies a measurement signal corresponding to the intensity of the environmental light to the sampling part 413.

The sampling part 413 converts the measurement signal of the environmental light from an analog signal to a digital signal in order of elapse of time by executing the sampling for the measurement signal (intensity value) of the environmental light from the environmental light sensor 412. The measurement data of the environmental light obtained as the result of the sampling is supplied to the optimal variation detecting part 414.

The optimal variation detecting part 414 detects an abrupt variation necessary for executing the photosynthesis gauging for the plant 1, of the variations of the intensity of the environmental light on the basis of the measurement data of the environmental light from the sampling part 413, and supplies the result of the detection to the central control part 400.

In other words, for example, in the case where Fv/Fm is calculated as the quantum yield of the photosynthesis, the intensity variation of the environmental light corresponding to the variation of the light emission intensity to the first growing light beam for the second section is detected from the measurement light beam for the first section. Moreover, for example, in the case where φPSII is calculated as the quantum yield of the photosynthesis, the intensity variation of the environmental light corresponding to the variation of the light emission intensity to the second growing light beam for the third section is detected from the first growing light beam for the second section in the light emission sequence of FIG. 11.

The chlorophyll fluorescence of the plant to which the environmental light such as the sunlight is applied is detected by the optical sensor 404 through the optical filter 403. In accordance with the control from the central control part 400, the sampling part 405 executes the sampling of the measurement signal (intensity value) of the chlorophyll fluorescence from the optical sensor 404. Concerning the above, the central control part 400 causes the sampling to be executed in accordance with the variation of the intensity of the environmental light on the basis of the detection result from the optimal variation detecting part 414.

In other words, for example, in the case where Fv/Fm is calculated as the quantum yield of the photosynthesis, the sampling of the chlorophyll fluorescence is caused to be executed at predetermined timings that correspond to the timings of the time t0, the time t1, the time t2, and the time t3 in FIG. 11 by detecting the intensity variation of the environmental light that corresponds to the variation of the light emission intensity in the light emission sequence depicted in FIG. 11. The predetermined values corresponding to the value of f0 and the values of f(t) (t=t1, t2, and t3) in FIG. 11 are thereby obtained as the measurement data of the transient response of the chlorophyll fluorescence of the plant 1.

Moreover, for example, in the case where φPSII is calculated as the quantum yield of the photosynthesis, the sampling of the chlorophyll fluorescence is caused to be executed at predetermined timings that correspond to the timings of the time ts0, the time ts1, the time ts2, and the time ts3 in FIG. 11 by detecting the intensity variation of the environmental light that corresponds to the variation of the light emission intensity in the light emission sequence depicted in FIG. 11. The predetermined values corresponding to the value of fs and the values of f(t) (t=ts1, ts2, and ts3) in FIG. 11 are thereby obtained as the measurement data of the transient response of the chlorophyll fluorescence of the plant 1.

The photosynthesis quantum yield computing part 410 calculates the quantum yields (Fv/Fm and φPSII) of the photosynthesis that each are the unknown parameter of the parameters relating to the transient model by applying the photosynthesis quantum yield calculation algorism in accordance with the transient model that presents the photosynthesis of a plant, to the measurement data of the transient response of the chlorophyll fluorescence of the plant 1. The result of the computation by the photosynthesis quantum yield computing part 410 is displayed on the result displaying part 411.

The photosynthesis gauging apparatus 40 is configured as above.

(Photosynthesis Gauging Process)

The photosynthesis gauging process executed by the photosynthesis gauging apparatus 40 in FIG. 21 is basically similar to the photosynthesis gauging process (FIG. 12) described above but differs therefrom in the point that the light beam to be applied to the plant 1 is only the environmental light such as the sunlight and the point that the timings of the sampling of the chlorophyll fluorescence of the plant 1 are determined in accordance with the timings of the intensity variation of the environmental light.

In other words, when the sampling is executed in the processes of steps S101 to S105 in FIG. 12, the environmental light such as the sunlight is used instead of the light beam by an LED or the like from the light emitting part 101 (FIG. 10). Moreover, the timings of the sampling of the chlorophyll fluorescence such as the times t0 to t3 and the times ts0 to ts3 are determined in accordance not with the variation of the light emission intensity of the light beam emitted from the light emitting part 101 (FIG. 10) but with the timings of the intensity variation of the environmental light such as the sunlight.

As above, in the fourth embodiment, the measurement data of the transient response of the chlorophyll fluorescence sampled at the timings in accordance with the intensity variation of the environmental light is obtained by setting only the environmental light such as the sunlight to be applied to the plant 1, and the quantum yield of the photosynthesis can be calculated by processing the measurement data as the input data in accordance with the photosynthesis quantum yield calculation algorism in accordance with the transient model such as the puddle model.

In other words, the above described photosynthesis gauging apparatus 10 (FIG. 10) or the like causes the light beam applied to the plant 1 to instantaneously be enhanced by controlling the intensity and the timings of the light beam applied to the plant 1, and executes the sampling at these timings. On the other hand, because the intensity variation of the environmental light such as the sunlight cannot be controlled, the photosynthesis gauging apparatus 40 of the fourth embodiment is adapted to detect the timings of the intensity variation and to execute sampling at the timings in accordance with the result of the detection.

For example, in the case where the environmental light is the sunlight, the variation of the intensity caused by passage of a cloud and the like only has to be detected. In other words, the photosynthesis gauging apparatus 40 of the fourth embodiment continuously measures the variation of the environmental light such as the sunlight using the environmental light sensor 412, selects the time when the convenient intensity variation of the environmental light happens to occur, and executes the gauging for the photosynthesis.

As above, in the fourth embodiment, the quantum yield of the photosynthesis is calculated using the intensity variation of the environmental light such as the sunlight without using not only the saturated light beam but also even the measurement light beam and the steady light beam (growing light beam). In other words, in the case where the intensity variation of the environmental light such as the sunlight, or the like is used, the light emission sequence depicted in FIG. 11 is not essential.

In addition, the approach of measuring the intensity of the environmental light using the environmental light sensor 412 has been described as an approach of measuring the variation of the intensity of the environmental light in the fourth embodiment while, for example, the fourth embodiment may be adapted to measure the variation of the intensity of the environmental light using another approach such as, for example, an approach of measuring the illuminance on the leaf surface of the plant 1.

6. Fifth Embodiment (Example of Configuration of Information Processing Apparatus)

Figure 22:
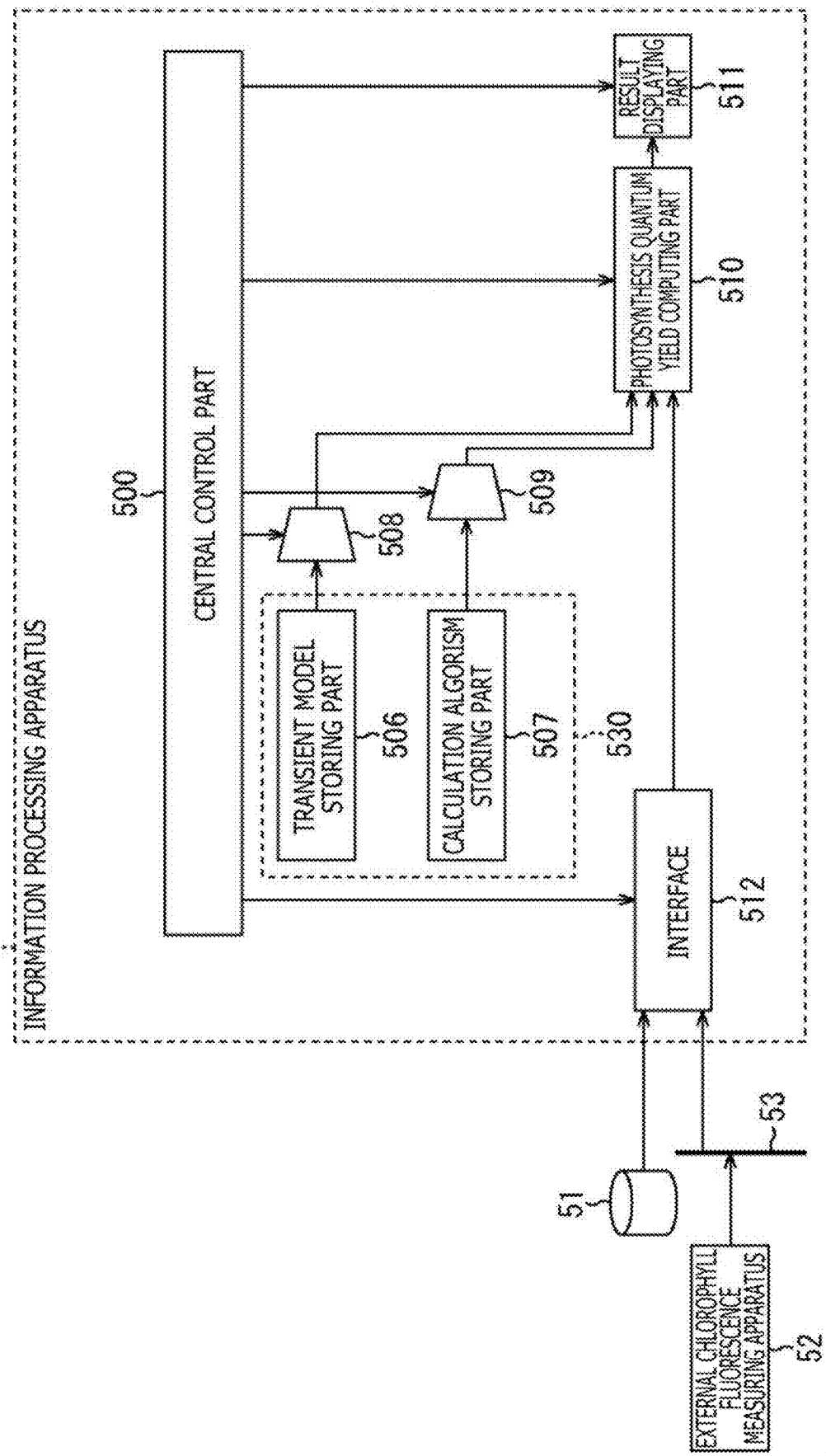
FIG. 22 is a diagram depicting an example of the configuration of an information processing apparatus of a fifth embodiment.

FIG. 22 is a diagram depicting an example of the configuration of an information processing apparatus 50 of the fifth embodiment.

In FIG. 22, the information processing apparatus 50 includes a central control part 500, a transient model storing part 506, a calculation algorism storing part 507, a selector 508, a selector 509, a photosynthesis quantum yield computing part 510, and a result displaying part 511. In this regard, the transient model storing part 506 and the calculation algorism storing part 507 are constituted as a storage part 530 that includes a semiconductor memory or the like.

Compared to the photosynthesis gauging apparatus 10 in FIG. 10, the information processing apparatus 50 in FIG. 22 differs therefrom in the point that an interface 512 is disposed therein instead of the light emitting part 101 to the sampling part 105. In addition, in the information processing apparatus 50, the configuration except the above is set to basically be similar to the configuration of the photosynthesis gauging apparatus 10 and will therefore properly not again be described.

The interface 512 includes an input and output interface circuit and the like, and is adapted to be connectable to an external chlorophyll fluorescence gauging apparatus 52 through an external storage 51 or a network 53.

The external storage 51 is, for example, a large-capacity recording apparatus such as a hard disc or a semiconductor memory. The external storage 51 accumulates therein files of measurement data of the transient response of the chlorophyll fluorescence of the plant 1 (hereinafter, referred to as "transient response measurement files"). The external storage 51 provides the transient response measurement files accumulated therein to the information processing apparatus 50 in response to a request or the like from the information processing apparatus 50. In the information processing apparatus 50, the transient response measurement files from the external storage 51 are supplied to the photosynthesis quantum yield computing part 510 through the interface 512.

The external chlorophyll fluorescence gauging apparatus 52 is an apparatus that gauges (measures) the chlorophyll fluorescence of the plant 1. For example, the external chlorophyll fluorescence gauging apparatus 52 has the functions that correspond to those of the central control part 100, the light emitting part 101, the light emission control part 102, the optical filter 103, the optical sensor 104, and the sampling part 105 depicted in FIG. 10, and can execute the sampling of the chlorophyll fluorescence of the plant 1 to which the measurement light beam or the growing light beams are applied.

In response to a request or the like from the information processing apparatus 50, the external chlorophyll fluorescence gauging apparatus 52 provides the measurement data of the transient response of the chlorophyll fluorescence of the plant 1 to the information processing apparatus 50 through the network 53. In the information processing apparatus 50, the measurement data of the transient response from the external chlorophyll fluorescence gauging apparatus 52 is supplied to the photosynthesis quantum yield computing part 510 through the interface 512.

In addition, in this case, the files of the measurement data (transient response measurement files) may be adapted to be provided instead of the measurement data of the transient response. Moreover, for example, an information processing apparatus such as a server connected to the network 53 such as the Internet may be adapted to provide the measurement data of the transient response or the transient response measurement files through the network 53.

In the information processing apparatus 50, the transient response measurement files or the measurement data of the transient response are/is provided from the external storage 51 or the external chlorophyll fluorescence gauging apparatus 52 to the photosynthesis quantum yield computing part 510. In this regard, the transient response measurement files include the measurement data of the transient response.

The photosynthesis quantum yield computing part 510 calculates the quantum yields (Fv/Fm and $\phi$PSII) of the photosynthesis that each are the unknown parameter of the parameters relating to the transient model by applying the photosynthesis quantum yield calculation algorism in accordance with the transient model that presents the photosynthesis of a plant, to the externally provided measurement data of the transient response. The result of the computation by the photosynthesis quantum yield computing part 510 is displayed on the result displaying part 511.

The information processing apparatus 50 is configured as above.

(Information Processing)

Compared to the above described photosynthesis gauging process (FIG. 12), the information processing executed by the information processing apparatus 50 in FIG. 22 differs therefrom in the point that the processes of steps S101 to S105 in the pre-stage are not executed and only the processes of steps S106 to S109 in the post-stage are executed.

In other words, the processes of steps S101 to S105 in the pre-stage are executed by the external chlorophyll fluorescence gauging apparatus 52, or the transient response measurement files obtained in the processes of steps S101 to S105 in the pre-stage are stored in the external storage 51. The information processing apparatus 50 thereafter executes the processes of steps S106 to S109 in the post-stage using the measurement data of the transient response obtained from the external storage 51 or the external chlorophyll fluorescence gauging apparatus 52.

As above, in the fifth embodiment, the quantum yield of the photosynthesis can be calculated by obtaining the externally provided measurement data of the transient response, and processing the measurement data as the input data in accordance with the photosynthesis quantum yield calculation algorism in accordance with the transient model such as the puddle model.

7. Modification Examples (Specific Examples of Measuring Apparatus for Plant)

Figure 23:
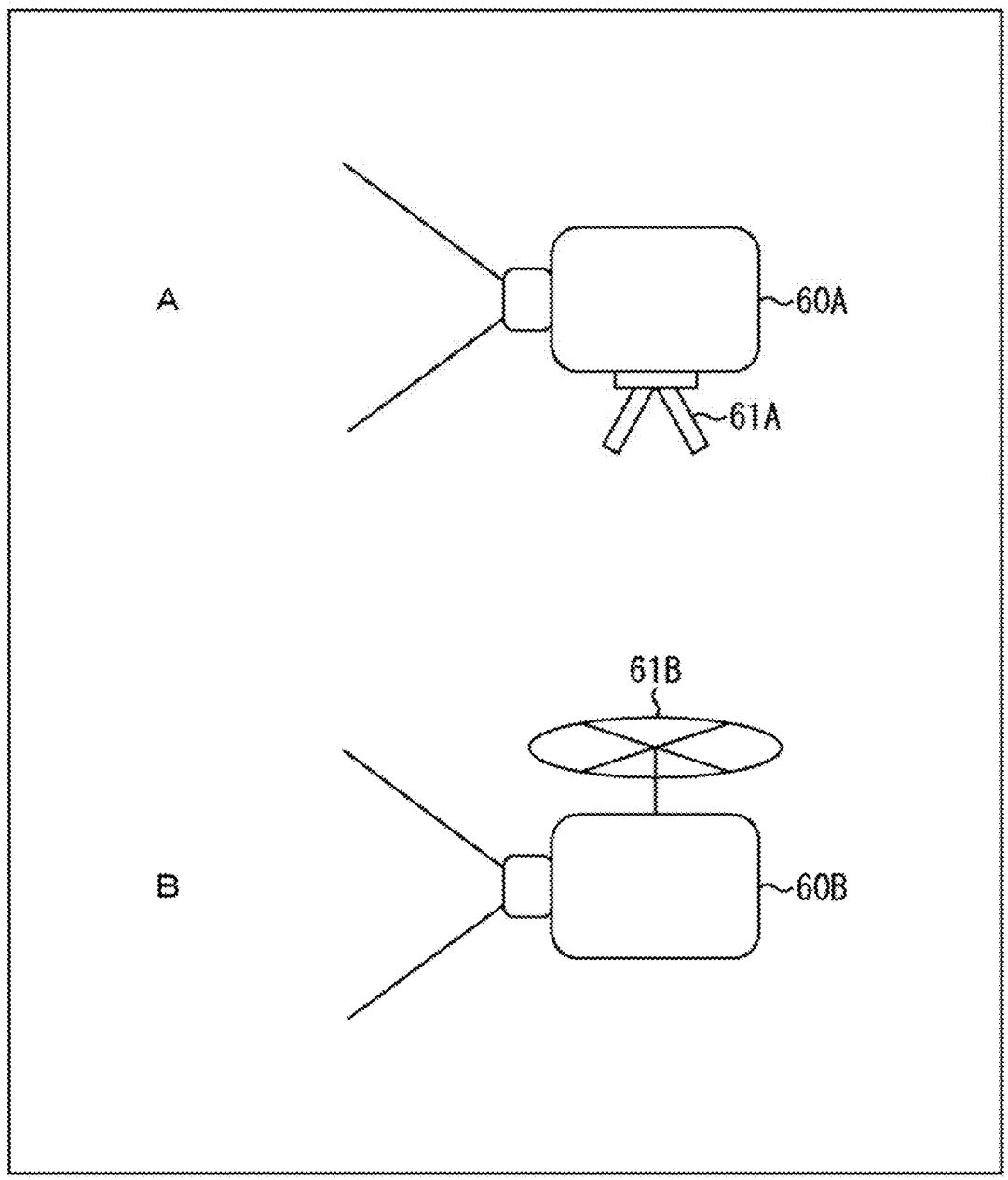
FIG. 23 is a diagram depicting a specific example of a measuring apparatus that executes measurement for a plant.

FIG. 23 depicts as examples a fixed-point measuring apparatus 60A executing fixed-point observation and a moving measuring apparatus 60B executing moving observation, as specific examples of the measuring apparatus executing the measurement for the plant 1 to be measured, in the first embodiment to the fifth embodiment described above.

The fixed-point measuring apparatus 60A depicted in A of FIG. 23 is fixed at a position at which the fixed-point measuring apparatus 60A can measure (sense) the plant 1 to be measured (such as, for example, a plant in a farm field), by fixed legs 61A and transmits the measurement data of the transient response of the chlorophyll fluorescence of the plant 1 measured there to the information processing apparatus 50 (FIG. 22) using, for example, wireless communication or the like. The information processing apparatus 50 can determine the quantum yield of the photosynthesis of the plant 1 that is fixed-point-observed by the fixed-point measuring apparatus 60A by processing the measurement data of the transient response transmitted from the fixed-point measuring apparatus 60A.

The moving measuring apparatus 60B depicted in B of FIG. 23 is, for example, an unmanned aerial vehicle (UAV), flies by the rotation of its propeller-like rotor blades 61B, and measures (aerially photographs) the plant 1 to be measured (such as, for example, a plant in a farm field) from the air over. The moving measuring apparatus 60B transmits the measurement data of the transient response of the chlorophyll fluorescence of the plant 1 measured there to, for example, the information processing apparatus 50 (FIG. 22) using, for example, wireless communication or the like. The information processing apparatus 50 can determine the quantum yield of the photosynthesis of the plant 1 moving-observed by the moving measuring apparatus 60B by processing the measurement data of the transient response transmitted from the moving measuring apparatus 60B.

Moreover, in addition to radio control, the moving measuring apparatus 60B may be adapted to autonomously fly using position information such as that by the GPS (Global Positioning System) by, for example, storing the flight route in advance as coordinate data. Moreover, the description has been made with reference to B of FIG. 23 assuming that the moving measuring apparatus 60B is a rotary-wing airplane that includes the rotor blades 61B while the moving measuring apparatus 60B may be a fixed-wing airplane.

Moreover, the description has been made assuming that the measurement data of the transient response measured by the fixed-point measuring apparatus 60A or the moving measuring apparatus 60B is transmitted to the information processing apparatus 50 (FIG. 22) and the quantum yield of the photosynthesis of the plant 1 is determined by the information processing apparatus 50 in the above description while the fixed-point measuring apparatus 60A or the moving measuring apparatus 60B may have the functions that are similar to those of the photosynthesis gauging apparatus 10 (FIG. 10) or the information processing apparatus 50 (FIG. 22), and may thereby determine the quantum yield of the photosynthesis of the plant 1.

(Target to be Measured Other than Plant)

The case where a plant is set to be the target to be measured has been described in the above description while all of living bodies can each be set as the target to be measured not limiting to a plant. In other words, as depicted in FIG. 9 described above, the present technique is characterized in that the unknown parameter of the parameters relating to a transient model is estimated (calculated) by applying the calculation algorism in accordance with the transient model to the measurement data of the transient response obtained from the target to be measured as the input, and this principle is applicable to all the living bodies.

According to the present technique, the unknown parameter of the parameters relating to a transient model can therefore be calculated by applying the calculation algorism in accordance with the transient model presenting the functions that the living body as the target has, to the measurement data of the transient response obtained from the living body to be measured as the input.

8. Configuration of Computer

The series of processes described above (such as, for example, at least a portion of the processing for the photosynthesis gauging process depicted in FIG. 12) can be executed by the hardware and can also be executed by software. In the case where the series of processes are executed by the software, the programs constituting the software are installed in a computer. FIG. 24 is a diagram depicting an example of the configuration of the hardware of the computer that executes the series of processes described above using the programs.

In the computer 1000, a CPU (Central Processing Unit) 1001, a ROM (Read Only Memory) 1002, and a RAM (Random Access Memory) 1003 are connected to each other by a bus 1004. An input and output interface 1005 is further connected to the bus 1004. An input part 1006, an output part 1007, a recording part 1008, a communicating part 1009, and a drive 1010 are connected to the input and output interface 1005.

The input part 1006 includes a keyboard, a mouse, a microphone, and the like. The output part 1007 includes a display, a speaker, and the like. The recording part 1008 includes a hard disc, a non-volatile memory, or the like. The communicating part 1009 includes a network interface and the like. The drive 1010 drives a removable storage medium 1011 such as a magnetic disc, an optical disc, a magneto-optical disc, or a semiconductor memory.

In the computer 1000 configured as above, the CPU 1001 loads the programs recorded in the ROM 1002 or the recording part 1008 onto the RAM 1003 through the input and output interface 1005 and the bus 1004 and executes the programs, and the series of processes described above are thereby executed.

The programs to be executed by the computer 1000 (CPU 1001) can be provided, for example, being recorded in the removable storage medium 1011 as a package medium or the like. Moreover, the programs can be provided through a wired or a wireless transmission medium such as a local area network, the Internet, or digital satellite broadcast.

For the computer 1000, attaching the removable storage medium 1011 to the drive 1010 enables the programs to be installed in the recording part 1008 through the input and output interface 1005. Moreover, the programs can be received by the communicating part 1009 through the wired or the wireless transmission medium transmission medium and can be installed in the recording part 1008. In addition, the programs can be installed in advance in the ROM 1002 or the recording part 1008.

Concerning the above, in this specification, the processes executed by the computer in accordance with the programs do not need to necessarily be executed in chronological order in accordance with the order described as the flowcharts. In other words, the processes executed by the computer in accordance with the programs include the processes to be executed in parallel to each other or to be each executed individually (such as, for example, the processes executed by parallel processing or by an object). Moreover, the programs may be those to be processed by one computer (one processor) or may be those to be processed by decentralized processing by plural computers.

In addition, the embodiments of the present technique are not limited to the embodiments descried above, and various changes can be made thereto within the scope not departing from the gist of the present technique. For example, all or some of the plural embodiments described above may be employed in combination.

In addition, the present technique can take the following configurations.

(1)
An information processing apparatus including:
a calculating part that applies a calculation algorism in accordance with a transient model that presents functions that a living body to be measured has, to measurement data of a transient response obtained from the living body, the calculating part thereby calculating an unknown parameter of parameters relating to the transient model.

(2)
The information processing apparatus described in (1), in which,
the living body includes a plant,
the transient model includes a model that represents an electron transfer system of a photochemical reaction in photosynthesis of the plant,
the calculation algorism includes an algorism to calculate a quantum yield of the photosynthesis from a transient response of chlorophyll fluorescence of the plant, using the transient model,
the measurement data includes measurement data of the transient response of the chlorophyll fluorescence of the plant, and
the calculating part calculates the quantum yield of the photosynthesis of the plant as the unknown parameter by applying the calculation algorism to the measurement data as an input.

(3)
The information processing apparatus described in (2), in which
the quantum yield of the photosynthesis of the plant is at least one of a maximal quantum yield (Fv/Fm) of the electron transfer system of the photosynthesis or a quantum yield ($\phi$PSII) of the electron transfer system of the photosynthesis.

(4)
The information processing apparatus described in any one of (1) to (3), in which
one or plural transient model(s) is/are prepared as the transient model, and
one or plural calculation model(s) is/are prepared in accordance with the transient model, as the calculation algorism.

(5)
The information processing apparatus described in any one of (1) to (4), further including:
a storage part that stores therein the transient model and the calculation algorism.

(6)
The information processing apparatus described in any one of (2) to (5), further including:
a light emission control part that controls a light emitting part such that the measurement data is obtained, the light emitting part emitting a light beam to the plant.

(7)
The information processing apparatus described in (6), further including:
the light emitting part; and
a sensor that senses the chlorophyll fluorescence of the plant.

(8)
The information processing apparatus described in (6), further including:
the light emitting part that emits a laser light beam;
a scanning part to scan the laser light beam; and
a sensor that senses the chlorophyll fluorescence of the plant.

(9)
The information processing apparatus described in (6), in which
the light emitting part includes an external light emitting apparatus that emits a light beam for growing the plant,
the information processing apparatus further includes:
an interface that is connected to the light emitting apparatus; and
a sensor that senses the chlorophyll fluorescence of the plant, and
the light emission control part controls the light emitting apparatus through the interface such that the measurement data is obtained.

(10)
The information processing apparatus described in (2), further including:
a first sensor that senses the chlorophyll fluorescence of the plant; and
a second sensor that senses environmental light during the sensing by the first sensor, in which
the calculating part calculates the quantum yield of the photosynthesis of the plant on a basis of the measurement data obtained when variation of the environmental light occurs.

(11)
The information processing apparatus described in (10), in which
the environmental light includes sunlight.

(12)
The information processing apparatus described in (2), further including:
an interface that is connected to an external processing apparatus, the external processing apparatus providing the measurement data, in which
the calculating part calculates the quantum yield of the photosynthesis of the plant on a basis of the measurement data provided from the processing apparatus through the interface.

(13)
The information processing apparatus described in (12), in which
the processing apparatus includes a gauging apparatus that gauges the measurement data or a recording apparatus that records therein the measurement data.

(14)

An information processing method of an information processing apparatus, the information processing method including a step, executed by the information processing apparatus, of:

applying a calculation algorism in accordance with a transient model presenting functions that a living body to be measured has, to measurement data of a transient response obtained from the living body and thereby calculating an unknown parameter of parameters relating to the transient model.

(15)

A program to cause a computer to function as an information processing apparatus including:

a calculating part that applies a calculation algorism in accordance with a transient model presenting functions that a living body to be measured has, to measurement data of a transient response obtained from the living body, the calculating part thereby calculating an unknown parameter of parameters relating to the transient model.

(16)

A sensing apparatus including:

a sensor that senses a living body to be measured; and a calculating part that applies a calculation algorism in accordance with a transient model presenting functions that a living body to be measured has, to measurement data of a transient response obtained from the living body by the sensing by the sensor, the calculating part thereby calculating an unknown parameter of parameters relating to the transient model.

REFERENCE SIGNS LIST

1 plant, 10, 20, 30, 40 photosynthesis gauging apparatus, 31 plant growing light emitting apparatus, 50 information processing apparatus, 51 external storage, 52 external chlorophyll fluorescence gauging apparatus, 53 network, 100, 200, 300, 400, 500 central control part, 101 light emitting part, 102, 202, 302 light emission control part, 103, 203, 303, 403 optical filter, 104, 204, 304, 404 optical sensor, 105, 205, 305, 405 sampling part, 106, 206, 306, 406, 506 transient model storing part, 107, 207, 307, 407, 507 calculation algorism storing part, 108, 208, 308, 408, 508 selector, 109, 209, 309, 409, 509 selector, 110, 210, 310, 410, 510 photosynthesis quantum yield computing part, 111, 211, 311, 411, 511 result displaying part, 130, 230, 330, 430, 530 storage part, 201 laser light emitting part, 212 actuator, 213 image synthesizing part, 312 interface, 412 environmental light sensor, 413 sampling part, 414 optimal variation detecting part, 512 interface, 1000 computer, 1001 CPU

The invention claimed is:

1. An information processing apparatus comprising:
calculation circuitry configured to apply a calculation algorism in accordance with a transient model that presents functions that a living body to be measured has as an equivalent electric circuit, to measurement data of a transient response obtained from the living body, the calculation circuitry thereby calculating an unknown parameter of parameters relating to the transient model, wherein
the living body includes a plant,
the transient model includes a model that represents an electron transfer system of a photochemical reaction in photosynthesis of the plant,
the calculation algorism includes an algorism to calculate a quantum yield of the photosynthesis from a transient response of chlorophyll fluorescence of the plant, using the transient model,
the measurement data includes measurement data of the transient response of the chlorophyll fluorescence of the plant, and
the calculation circuitry calculates the quantum yield of the photosynthesis of the plant as the unknown parameter by applying the calculation algorism to the measurement data as an input.

2. The information processing apparatus according to claim 1, wherein
the quantum yield of the photosynthesis of the plant is at least one of a maximal quantum yield (Fv/Fm) of the electron transfer system of the photosynthesis or a quantum yield ($\phi$PSII) of the electron transfer system of the photosynthesis.

3. The information processing apparatus according to claim 1, wherein
one or plural transient model(s) is/are prepared as the transient model, and
one or plural calculation model(s) is/are prepared in accordance with the transient model, as the calculation algorism.

4. The information processing apparatus according to claim 1, further comprising:
a memory configured to store therein the transient model and the calculation algorism.

5. The information processing apparatus according to claim 1, further comprising:
light emission control circuitry configured to control a light emitting device such that the measurement data is obtained, the light emitting device emitting a light beam to the plant.

6. The information processing apparatus according to claim 5, further comprising:
the light emitting device; and
a sensor that senses the chlorophyll fluorescence of the plant.

7. The information processing apparatus according to claim 5, further comprising:
the light emitting device, which is configured to emit a laser light beam;
a scanner configured to scan the laser light beam; and
a sensor configured to sense the chlorophyll fluorescence of the plant.

8. The information processing apparatus according to claim 5, wherein
the light emitting device includes an external light emitting apparatus that emits a light beam for growing the plant,
the information processing apparatus further includes:
an interface that is connected to the light emitting apparatus; and
a sensor that senses the chlorophyll fluorescence of the plant, and
the light emission control circuitry controls the light emitting apparatus through the interface such that the measurement data is obtained.

9. The information processing apparatus according to claim 1, further comprising:
a first sensor configured to sense the chlorophyll fluorescence of the plant; and
a second sensor configured to sense an environmental light during the sensing by the first sensor, wherein the calculation circuitry calculates the quantum yield of the photosynthesis of the plant on a basis of the measurement data obtained by variation of the environmental light.

10. The information processing apparatus according to claim 9, wherein
the environmental light includes sunlight.

11. The information processing apparatus according to claim 1, further comprising:
an interface that is connected to an external processing apparatus, the external processing apparatus providing the measurement data, wherein
the calculation circuitry calculates the quantum yield of the photosynthesis of the plant on a basis of the measurement data provided from the processing apparatus through the interface.

12. The information processing apparatus according to claim 11, wherein
the processing apparatus includes a gauging apparatus that gauges the measurement data or a recording apparatus that records therein the measurement data.

13. An information processing method of an information processing apparatus, the information processing method comprising operations, executed by the information processing apparatus, including:
applying a calculation algorism in accordance with a transient model presenting functions that a living body to be measured has as an equivalent electric circuit, to measurement data of a transient response obtained from the living body and thereby calculating an unknown parameter of parameters relating to the transient model, wherein
the living body includes a plant,
the transient model includes a model that represents an electron transfer system of a photochemical reaction in photosynthesis of the plant,
the calculation algorism includes an algorism to calculate a quantum yield of the photosynthesis from a transient response of chlorophyll fluorescence of the plant, using the transient model, and
the measurement data includes measurement data of the transient response of the chlorophyll fluorescence of the plant; and
calculating the quantum yield of the photosynthesis of the plant as the unknown parameter by applying the calculation algorism to the measurement data as an input.

14. A non-transitory computer-readable medium storing instructions that, when executed by a processor of an information processing apparatus, cause the information processing apparatus to perform operations comprising:
applying a calculation algorism in accordance with a transient model presenting functions that a living body to be measured has as an equivalent electric circuit, to measurement data of a transient response obtained from the living body, thereby calculating an unknown parameter of parameters relating to the transient model, wherein
the living body includes a plant,
the transient model includes a model that represents an electron transfer system of a photochemical reaction in photosynthesis of the plant,
the calculation algorism includes an algorism to calculate a quantum yield of the photosynthesis from a transient response of chlorophyll fluorescence of the plant, using the transient model, and
the measurement data includes measurement data of the transient response of the chlorophyll fluorescence of the plant;
calculating the quantum yield of the photosynthesis of the plant as the unknown parameter by applying the calculation algorism to the measurement data as an input.

15. A sensing apparatus comprising:
a sensor configured to sense a living body to be measured; and
calculation circuitry configured to apply a calculation algorism in accordance with a transient model presenting functions that the living body has as an equivalent electric circuit, to measurement data of a transient response obtained from the living body by the sensing by the sensor, the calculation circuitry thereby calculating an unknown parameter of parameters relating to the transient model,
wherein
the living body includes a plant,
the transient model includes a model that represents an electron transfer system of a photochemical reaction in photosynthesis of the plant,
the calculation algorism includes an algorism to calculate a quantum yield of the photosynthesis from a transient response of chlorophyll fluorescence of the plant, using the transient model,
the measurement data includes measurement data of the transient response of the chlorophyll fluorescence of the plant, and
the calculation circuitry calculates the quantum yield of the photosynthesis of the plant as the unknown parameter by applying the calculation algorism to the measurement data as an input.

* * * * *